United States Patent
Kurata et al.

(10) Patent No.: US 12,529,845 B2
(45) Date of Patent: Jan. 20, 2026

(54) OPTICAL WAVEGUIDE DEVICE AND METHOD FOR MANUFACTURING THE SAME

(71) Applicant: NTT, Inc., Tokyo (JP)

(72) Inventors: Yu Kurata, Musashino (JP); Kenya Suzuki, Musashino (JP); Yoshie Morimoto, Musashino (JP)

(73) Assignee: NTT, Inc., Tokyo (JP)

( * ) Notice: Subject to any disclaimer, the term of this patent is extended or adjusted under 35 U.S.C. 154(b) by 323 days.

(21) Appl. No.: 18/006,449

(22) PCT Filed: Aug. 25, 2020

(86) PCT No.: PCT/JP2020/031935
§ 371 (c)(1),
(2) Date: Jan. 23, 2023

(87) PCT Pub. No.: WO2022/044102
PCT Pub. Date: Mar. 3, 2022

(65) Prior Publication Data
US 2023/0266534 A1    Aug. 24, 2023

(51) Int. Cl.
*G02B 6/122* (2006.01)
*G02B 6/13* (2006.01)

(52) U.S. Cl.
CPC ............. *G02B 6/1228* (2013.01); *G02B 6/13* (2013.01)

(58) Field of Classification Search
CPC ...... G02B 6/1223; G02B 6/1228; G02B 6/13; G02B 6/305; G02B 2006/12061; G02B 2006/12195
See application file for complete search history.

(56) References Cited

U.S. PATENT DOCUMENTS

2004/0037497 A1   2/2004  Lee
2004/0067023 A1   4/2004  Hanashima et al.

FOREIGN PATENT DOCUMENTS

| JP | H05249331 A | * | 9/1993 |
| JP | 2004-258610 A | | 9/2004 |
| JP | 2005-538426 A | | 12/2005 |
| JP | 62-90742 B2 | | 3/2018 |
| WO | 2004/038459 A2 | | 8/2003 |

* cited by examiner

*Primary Examiner* — Thomas A Hollweg
(74) *Attorney, Agent, or Firm* — Workman Nydegger

(57) ABSTRACT

The optical waveguide component of the present disclosure provides a configuration for optically connecting two optical waveguides composed of different materials with low loss. The first optical circuit including the core of a first material and a second optical circuit including a core of a second material are configured on a single substrate. The optical waveguide component of the present disclosure includes an optical connection part between two optical circuits, and has a double structure in which a core cross-sectional region of one optical waveguide is included in a core cross-sectional region of the other optical waveguide between the two optical waveguides. The optical connection part is provided with a protrusion part of the underclad extending along the first core from the high-level surface toward the low-level surface of the underclad toward, and the width of the protrusion part is gradually narrowed toward the second optical circuit.

7 Claims, 13 Drawing Sheets

OPTICAL WAVEGUIDE DEVICE AND METHOD FOR MANUFACTURING THE SAME

TECHNICAL FIELD

The present invention is related to an optical waveguide component applicable to an optical communication system.

BACKGROUND ART

In recent years, with the spread of optical fiber transmission, a technique for integrating a large number of optical circuits with high density has been required. As one of the high density integration techniques of such optical circuits, silicon photonics (hereinafter, SiPh) is known. Since the relative refractive index difference between a core and a clad of the optical waveguide is large in the SiPh, an optical circuit having a small bending radius can be constituted, and a very small optical circuit can be realized. In the transmission device, optical functional elements such as a photo diode (PD) for converting optical and electrical signals and an optical modulator for modulating the intensity and phase of the optical signal are also required. For these optical functional elements, it is also possible to realize a PD and an optical modulator by using a semiconductor function of Si, and to integrate them in an optical circuit.

The above-mentioned SiPh circuit is suitable for a highly functional optoelectronic integrated device in which an optical waveguide for performing optical signal processing and an optical device such as a PD for performing photo-electric conversion are integrated in order to increase the communication capacity. By integrating an optical circuit function and an optical function element using SiPh, a transmission and reception function of an optical signal can be realized in a small size, and for example, a small-sized optical transmission and reception module using SiPh has been developed (PTL 1).

The SiPh circuit is small in size and has advantages those various optical functions such as photoelectric conversion and modulation can be realized, while a problem caused by a manufacturing error can be caused because the relative refractive index difference between the core and the clad is large. Specifically, in a wavelength multiplexer/demultiplexer such as a Mach-Zehnder optical interferometer and an arrayed waveguide grating (AWG), a large phase error is caused by a small manufacturing error, and the optical characteristics are deteriorated. Further, in the SiPh circuit, since the mode field of the propagating light is small, there is a problem that loss is large in connection with an optical fiber having mode and a large field, transmission characteristics are deteriorated. The SiPh has the above-mentioned problems in terms of the accuracy of the optical circuit function and the connectivity with an optical fiber, and a further high-performance optical circuit has been required.

As another optical circuit for compensating for the above-mentioned defects of the SiPh circuit, a silica-based planar lightwave circuit (PLC) is known. The PLC is a waveguide type optical device having excellent characteristics such as low loss, high reliability, and high degree of freedom in design, and actually the PLC in which functions such as a multiplexer/demultiplexer and a branching/coupler are integrated is mounted in a transmission device of an optical communication transmission system. Since a phase error is small in the PLC, a high-precision and large-scale wavelength multiplexing/demultiplexing is possible (PTL 1), and an optical circuit function which is small in polarization dependency and temperature dependency and is not suitable for the SiPh circuit can be realized with high performance. Since the optical waveguide is constituted of the same material system as the optical fiber in the PLC, propagation loss is small, and low loss coupling with the optical fiber can be realized by bringing the mode field close to the optical fiber. By utilizing the features of the high-performance SiPh circuit and the high-performance PLC as described above, combining and integrating these features, a more compact and high-performance optical device is expected.

CITATION LIST

Patent Literature

[PTL 1] Japanese Patent No. 6290742

SUMMARY OF INVENTION

Technical Problem

However, the coupling loss is still a problem when optical circuits composed of different materials are coupled to each other, as in the case where the SiPh circuit and the PLC are coupled to each other. In order to couple the optical circuits manufactured separately, "butt coupling" is required to butt the input and output waveguides to align and fix the input and output waveguides.

FIGS. 1A and 1B are diagrams showing a configuration of an optical circuit in which the SiPh circuit and the PLC are coupled together in a butted manner. FIG. 1A is a top view of the substrate plane (x-y plane) of the optical circuit including the "butt coupling", and FIG. 1B is a cross-sectional view of the plane (x-z plane) which passes through the coupled optical waveguide (Ib-Ib line) and is perpendicular to the substrate plane. The mode of butting and coupling optical circuits composed of different materials as shown in FIG. 1A is called "hybrid integration". Referring to FIG. 1A, the optical circuit is composed of an SiPh circuit 1 and a PLC 2, and both are fixed through an adhesive 14. In the SiPh circuit 1, the optical waveguide 4 is formed between an underclad layer 8 and an overclad layer 9 formed on a substrate 7. The optical waveguide of the optical circuit 1 is composed of a square normal optical waveguide 4a and a tapered part 4b as a spot size converter (SSC) at the tip. In the PLC 2, an optical waveguide 5a is constituted between an underclad layer 11 and an overclad layer 12 formed on a substrate 10.

In the optical circuit by "butt coupling" shown in FIG. 1A, since the SiPh circuit 1 and the PLC 2 which are separately manufactured are fixed by the adhesive 14, it is difficult to make the distance between the optical waveguides completely zero due to a processing error and a mounting error. Therefore, light is emitted from one optical waveguide to the space (the adhesive 14), and the beam is made incident on the other optical waveguide to be a pair, so that optical coupling (also called optical connection) can be performed. When light is emitted to a space, the emitted beam is expanded by diffraction, so that overlapping of the emitted beam and the mode field of the propagation light of the input side waveguide is reduced and loss is generated. Further, since reflection is generated by the refractive index difference between the end face of the optical waveguide and the space to generate loss, it is necessary to highly accurately adjust the core with an appropriate interval between the SiPh circuit 1 and the PLC 2 and fix both of them. As described above, in the approach of hybrid integration, it is necessary to butt and couple the optical waveguides on the respective substrates, and there are problems of complexity of alignment and diffraction loss due to the thickness of the adhesive at the coupling part.

For the hybrid integration described above, an approach of "monolithic integration" is known in which optical waveguides composed of different materials are integrated on a common single substrate. Both of the SiPh circuit and the PLC are optical circuits formed on an Si substrate, and the materials of the substrate are the same. By forming an Si core and an $SiO_2$ core on the SOI (Silicon On Insulator) substrate, both of the SiPh circuit and the PLC can be integrated at the same time.

FIG. 2 is a diagram conceptually illustrating a process of monolithic integration for optical circuits of different optical waveguides. In FIG. 2, since the description of the manufacturing process is focused, the structure in which different optical waveguides are connected is not shown, and only the cross-section perpendicular to the longitudinal direction of the optical waveguides is shown. In the manufacturing process of the optical circuit by hybrid integration, an SOI substrate 13 is first prepared in the first process. The SOI substrate 13 includes a box layer 8 of a buried oxide (BOX) film, and an uppermost Si layer 4 on an Si substrate 7. In a next second process, the Si layer 4 is processed to form an Si core 4a of the optical waveguide of the SiPh circuit 1. In a third process, an $SiO_2$ film 5 is deposited on the entire surface of the box layer 8 including the Si core 4a. Then, in a fourth process, the $SiO_2$ film 5 is processed to form an $SiO_2$ core 5a which becomes an optical waveguide core of the PLC 2. In a fifth process, an overclad layer 9 is deposited. In the final sixth process, the overclad layer 9 is removed from the required processing portion of the SiPh circuit 1 in order to form wiring patterns.

By a series 4 photolithography processes of monolithic integration of FIG. 2, two optical circuits composed of optical waveguides composed of different materials of the SiPh circuit 1 including the Si core 4a and the PLC 2 including the $SiO_2$ core 5a can be integrated on one wafer (SIO substrate). In monolithic integration, complicated alignment in an optical circuit by "butt coupling" of the hybrid integration shown in FIGS. 1A and 1B and connection by an adhesive are not required, and connection can be performed without leaving a space between the SiPh circuit 1 and the PLC 2.

However, although the optical circuit according to the monolithic integration shown in FIG. 2 solves the problem of the optical circuit in the hybrid integration, the problem of the optical connection loss still remains. Specifically, the problem is that the mode field diameter (MFD) of the propagating light between two optical waveguides composed of different materials is mismatched and the core height between the two optical waveguides is mismatched.

FIGS. 3A and 3B are diagrams for explaining the center deviation of the optical waveguides of the monolithic integrated optical circuit. Similarly to FIGS. 1A and 1B, FIG. 3A is a top view of the substrate plane (x-y plane) of the monolithically integrated optical circuit, and FIG. 3B is a cross-sectional view of the plane (x-z plane) which passes through the optical waveguide (IIIb-IIIb line) and is perpendicular to the substrate plane. The monolithic integrated optical circuit shown in FIGS. 3A and 3B is manufactured in a series of processes described in FIG. 2, and the structure of the cross-sectional view of FIG. 3B corresponds to the structure of two optical waveguides manufactured in the processes shown in FIG. 2. As can be understood from the manufacturing process of FIG. 2, the center height of the Si core 4 and the $SiO_2$ core 5a is deviated in the direction perpendicular to the substrate (z axis direction), and the mode field center of light propagating through the two cores 4, 5a is also deviated, and optical connection loss is generated.

FIGS. 4A and 4B are diagrams showing a configuration for eliminating positional deviation of the optical waveguides in monolithic integration. Similarly to FIGS. 1A-1B and 3A-3B, FIG. 4A is a top view of the substrate plane (x-y plane) of the monolithically integrated optical circuit, and FIG. 4B is a cross-sectional view of the plane (x-z plane) which passes through the optical waveguides (IVb-IVb line) and is perpendicular to the substrate plane. In the configuration shown in FIGS. 4A and 4B, the upper surface of the underclad of the box layer 8 is cut on the PLC 2 side to make the underclad 8-2 lowered in height, whereby the center heights of the two cores 4, 5a can be made to match with each other. Even in this configuration, the mismatch of MED on the boundary plane between the SiPh circuit 1 and the PLC 2 where the Si core 4 is interrupted remains, and the optical connection loss is generated.

As described above, when an optical signal is inputted and outputted between an optical circuit having Si as a core and an optical circuit having $SiO_2$ as a core by using monolithic integration, there remains a problem that optical connection loss occurs. There is a need for realizing low-loss optical connection by a simple structure and a manufacturing process, which can be applied to optical integration of different materials in which various optical circuit functions with different materials as cores are integrated on a common single substrate.

The present invention has been made in view of such problems, and an object of the present invention is to provide an optical waveguide component which realize a low loss optical connection with a simple structure and a simple manufacturing method.

Solution to Problem

One embodiment of the present invention relates to an optical waveguide component for optically connecting optical waveguides composed of different materials on a substrate, the optical waveguide component include a first optical circuit having an optical waveguide of a first core composed of a first material, a second optical circuit having an optical waveguide of a second core composed of a second material having a lower refractive index than the first material, and an optical connection part of the first core and the second core, and the second core is configured to be extended to the first optical circuit so that a first core region is included in a second core region in a cross section perpendicular to a length direction of the optical waveguide, and the optical connection part has a vertical tapered structure in which the height of the extended second core is lowered from the first optical circuit toward the second optical circuit.

Another embodiment of the present invention relates to a method of manufacturing an optical waveguide component for optically connecting optical waveguides composed of different materials, the method includes the steps of forming a first core composed of a first material on a substrate provided with an underclad layer, forming a high-level surface corresponding to a first optical circuit, a low-level surface corresponding to a second optical circuit, and a protrusion part extending along the first core from the high-level surface toward the second optical circuit by processing the underclad layer, depositing a core layer of a second material having a lower refractive index than the first material, forming a second core from the first optical circuit to the second optical circuit by processing the deposited core layer, and forming a vertical tapered structure in which the second core is configured to include the region of the first core in the region of the second core in a cross section perpendicular to the length direction of the optical waveguide, and the height of the second core is lowered from the first optical circuit toward the second optical circuit.

Advantageous Effects of Invention

To provide an optical waveguide component which realizes low-loss optical connection with a simple structure and a method of manufacturing the same.

DESCRIPTION OF EMBODIMENTS

The optical waveguide component of the present disclosure provides a configuration for optically connecting two optical waveguides composed of different materials with low loss. A first optical circuit including a core composed of a first material and a second optical circuit including a core composed of a second material are configured on a single substrate. The optical waveguide component of the present disclosure has an optical connection part between two optical circuits, and double structure in which a core cross-sectional region of one optical waveguide is included in a core cross-sectional region of the other optical waveguide between the two optical waveguides.

The optical connection part is provided with a protrusion part of the underclad extending along the first core from the high-level surface of the underclad toward the low-level surface of the underclad, and the width of the protrusion part is gradually narrowed toward the second optical circuit. The optical connection part has a vertical tapered structure in which the second core region formed extending from the second optical circuit covers the first core, and the height of the extended second core region gradually decreases toward the second optical circuit. In the cross-section of the optical connection part, the area of the protrusion part of the underclad is gradually reduced, and the area ratio occupied by the second core region extended from the second optical circuit is gradually increased. By smoothly changing the cross-sectional structure in the optical connection part, the mismatching of the MED and the deviation of the MF center are relaxed. Hereinafter, a detail configuration of the optical component of the present disclosure and a manufacturing method thereof will be described with reference to the drawings.

Figure 5A:
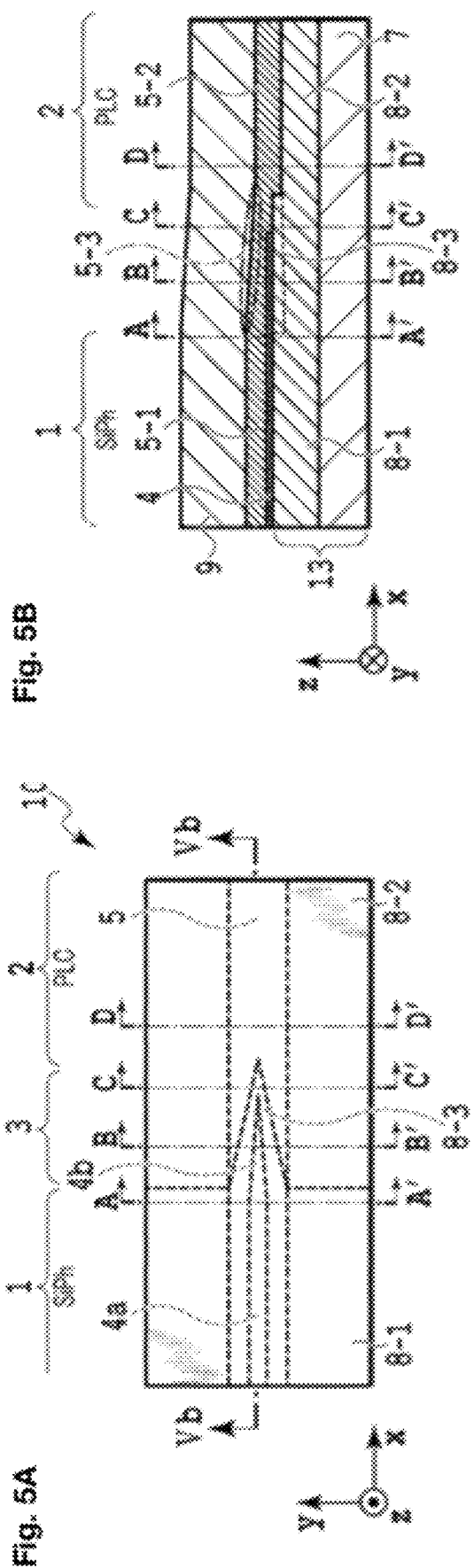
FIG. 5A is a top view of the substrate plane (x-y plane) of the optical waveguide component.
Figure 5B:
FIG. 5B is a side view of the cross-section (x-z plane) passing through the center of the two optical waveguides (Vb-Vb line) and FIG. 5C is a cross-sectional view of the plane (y-z plane) perpendicular to the length direction at each part of the optical waveguide.
Figure 5C:
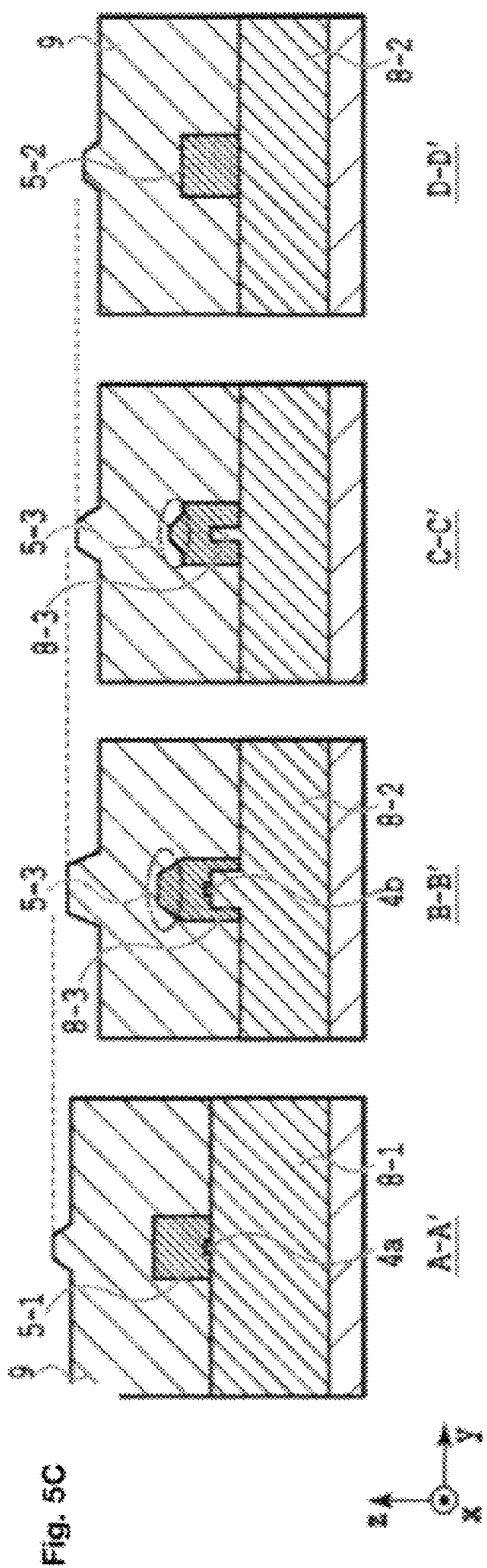

FIGS. 5A-5C are diagrams showing a configuration of the optical waveguide component in which different optical waveguides of the present disclosure are coupled. FIG. 5A is a top view of the substrate plane (x-y plane) of the optical waveguide component 100, FIG. 5B is a side view of the cross-section (x-z plane) passing through the center of the two optical waveguides (Vb-Vb line) and FIG. 5C is a cross-sectional view of the plane (y-z plane) perpendicular to the length direction at each part of the optical waveguide. In the optical waveguide component 100, the first optical circuit (SiPh circuit 1) using Si as a core 4 and the second optical circuit (PLC 2) using $SiO_2$ as a core 5 are formed on a common substrate 7, and input and output of an optical signal is performed between the two optical circuits. Between the two optical circuits 1, 2, the optical connection part 3 is provided for gradually matching the heights of the cores of the optical waveguides composed of different materials.

Referring to FIG. 5A, the region of the first optical circuit 1 and the region of the second optical circuit 2 have underclad layers 8-1 and 8-2 having different heights. The underclad layers 8-1 and 8-2 having different heights can be understood from the side view of FIG. 5B and the A-A' cross section and the D-D' cross section of FIG. 5C. This point is similar to the structure of the underclad layer provided with steps by monolithic integration shown in FIG. 4.

The difference from the optical circuit of the prior art is that the optical connection part 3 is provided with a protrusion part 8-3 formed with extending along the Si core 4a from the "high surface" of the underclad 8-1 of the first optical circuit 1 toward the low surface of the underclad "8-2" of the second optical circuit 2. Hereinafter, the high surface of the underclad 8-1 is referred to as a "high-level surface", and the low surface of the underclad 8-2 is referred to as a "low-level surface". Further, the width of the protrusion part 8-3 of the underclad is gradually narrowed toward the second optical circuit 2. In the optical connection part 3, the Si core 4b is continuously formed up to the middle of the upper surface of the protrusion part 8-3, and the $SiO_2$ core 5-2 of the second optical circuit 2 is constituted so as to include the Si cores 4a, 4b of the first optical circuit 1 when viewed in a cross-section perpendicular to the length direction of the optical waveguide.

Further, a characteristic vertical taper structure 5-3 is formed so as to cover the protrusion part 8-3 corresponding to the protrusion part 8-3 of the underclad of the optical connection part 3. The vertical tapered structure 5-3 of $SiO_2$ is formed as "integral" together with the $SiO_2$ region 5-1 of the first optical circuit 1 continuously from the $SiO_2$ core 5-2 of the second optical circuit 2. That is, the $SiO_2$ region 5-1, the vertical tapered structure 5-3 and the $SiO_2$ core 5-2 are simultaneously formed by a common $SiO_2$ film deposition process and an optical waveguide manufacturing process. Therefore, three regions 5-1, 5-2, and 5-3 of the $SiO_2$ film formed along the Si cores 4a, 4b are shown as a single $SiO_2$ region 5 in the top view of FIG. 5A. Referring to a cross-sectional view of each part of FIG. 5C, the shape and height of the $SiO_2$ region 5 is gradually changed by passing from the $SiO_2$ region 5-1 of a A-A' cross-section of the first optical circuit 1 to the $SiO_2$ core 5-2 of a D-D' cross-section of the second optical circuit 2 through the vertical taper structure 5-3 of a B-B' cross-section and a C-C' cross-section. At the same time, it is noted that the shape and height of the uppermost part of the overclad 9 covering the entire $SiO_2$ region 5 are changed.

The above-mentioned vertical tapered structure 5-3 has a structure in which the width of the protrusion part 8-3 is gradually reduced toward the second optical circuit 2. The vertical tapered structure utilizes the effect that the height of the $SiO_2$ film becomes lower as the $SiO_2$ film is deposited in a narrow region in the deposition process of the thin film. In the region of the first optical circuit 1, the $SiO_2$ region 5-1 is formed so as to surround the Si core 4. It should be noted that the iO2 region 5-1 is integrally formed continuously from the $SiO_2$ core 5-2 in the second optical circuit 2, but the iO2 region 5-1 functions as a "clad" in the optical waveguide of the first optical circuit 1. In other words, the core of the second optical circuit 2 functions as a clad in the first optical circuit 1. As a result, it can be seen from the cross-section perpendicular to the length direction of the optical waveguide that the cross-sectional region of the waveguide core 4 of the first optical circuit 1 is included in the cross-sectional region of the waveguide core 5-2 of the second optical circuit 2.

The optical signal is propagated so that the center of the MF is brought close between the Si core 4 and the $SiO_2$ core 5-2 by the vertical tapered structure 5-3 of the optical connection part 3 formed by extending from the $SiO_2$ core 5-2 shown in FIG. 5B, and the coupling loss can be reduced. From various viewpoints, the configuration of the optical waveguide component 100 in which the different optical waveguides of the present disclosure are coupled, and the mechanism and effect of reducing the coupling loss will be described below.

As outlined in FIGS. 5A-5C, the optical waveguide component 100 monolithically integrates on a common single substrate 7 the first optical waveguide having the first core 4a (Si), and the second optical waveguide having the second core 5-2 ($SiO_2$) composed of a material having a refractive index lower than that of the first core. Here, the structure of the optical connection part 3 between the two optical circuits 1, 2 is viewed from the transition of the form of the core of the optical waveguide by changing the viewpoint. In the optical connection part 3 for optically connecting the first optical waveguide and the second optical waveguide, an overlapping region (overlapping region: B-B' cross-section) where the second core 5-2 and the first core 4 bare overlapped on an extension of the first core 4a and a non-overlapping region (non-overlapping region: C-C' cross-section) which continues from the overlapping region, is constituted by only the second core 5-2 with end of the first core 4b exist. The vertical tapered structure 5-3 is formed over the overlapping region and the non-overlapping region. In the vertical tapered structure 5-3, the height of the second core 5-2 gradually decreases from the overlapping region toward the non-over lapping region of the optical connection part 3 with reference to the upper surface of the substrate in the perpendicular direction (z direction) to the substrate plane of the substrate 7.

Figure 4A:
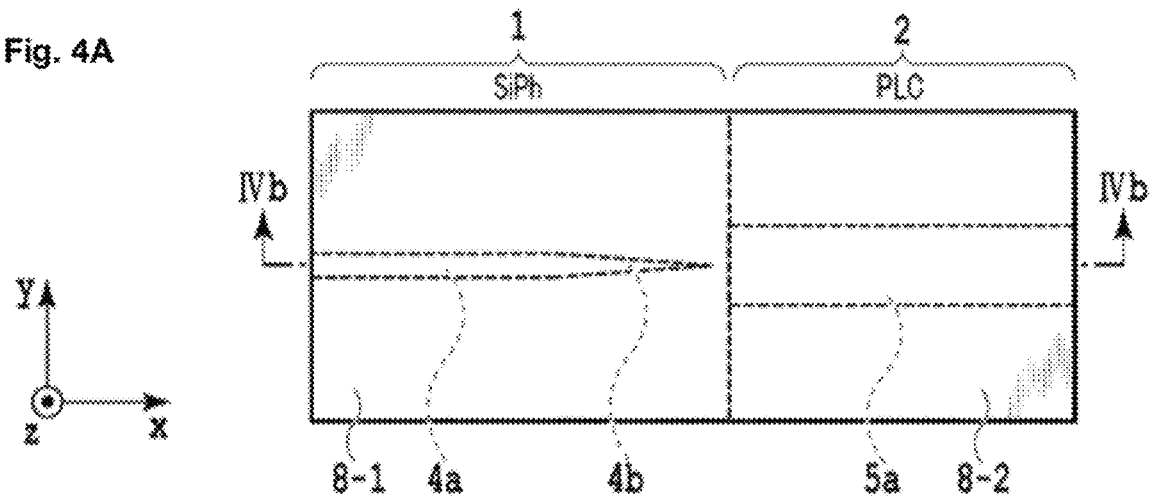
FIG. 4A is a top view of the substrate plane (x-y plane) of the monolithically integrated optical circuit and FIG. 4B is a cross-sectional view of the plane (x-z plane) which passes through the optical waveguides (IVb-IVb line) and is perpendicular to the substrate plane.
Figure 4B:
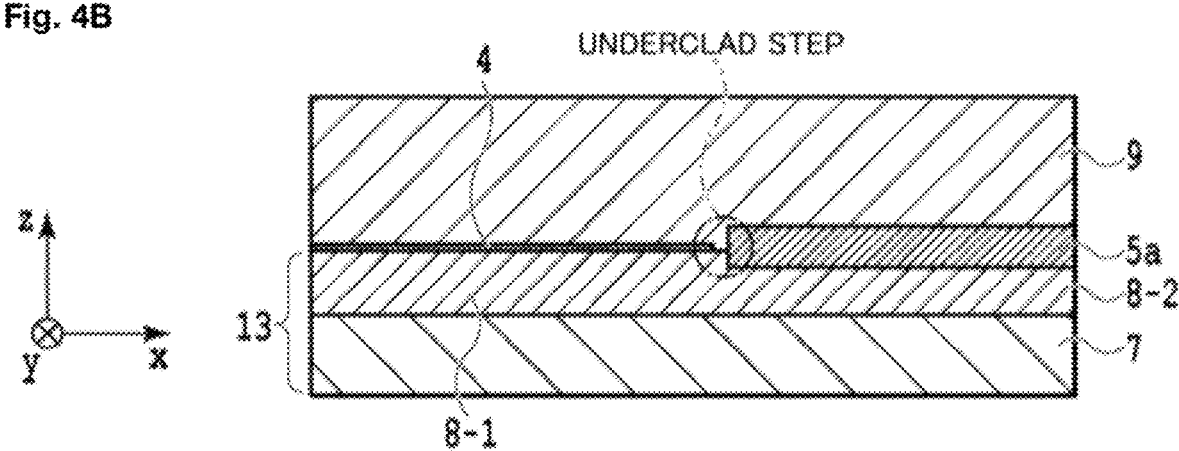

Normally, in the optical connection part 3 between the SiPh circuit 1 and the PLC 2, the MED of the SiPh circuit 1 is enlarged and matched by the spot size converter (SSC) according to the MED on the PLC 2 side having the large MFD. For example, the SSC structure can be realized by the thin tapered Si core 4b whose width is narrowed from the rectangular shaped Si core 4a toward the tip as shown in FIGS. 4A and 4B of the prior art.

In the optical waveguide component 100 of the present disclosure, in addition to the thin taper structure of the Si core, a step is provided on the upper surfaces of the underclads 8-1 and 8-2 located immediately above the substrate 7. The protrusion part 8-3 formed going from the high-level surface side toward the low-level surface side of the underclad along the Si core 4a and extending from the high-level surface side is configured across the step. The width of the protrusion 8-3 is provided with a tapered structure in the horizontal direction (y direction), which gradually narrows toward the PLC 2 side. The Si core is covered with the $SiO_2$ film while gradually lowering the height from the SiPh circuit 1 toward the PLC 2 by the tapered structure of the protrusion part 8-3 corresponding to the thin tapered structure of the Si core. The vertical tapered structure 5-3 of the optical connection part 3 is formed by the thin tapered structure of the Si core and the tapered structure of the protrusion part 8-3. The $SiO_2$ core 5-1 functioning as a clad of the first optical waveguide, the vertical tapered structure 5-3 of the optical connection part 3, and the $SiO_2$ core 5-2 of the second optical waveguide are continuously and integrally constituted smoothly.

The vertical tapered structure 5-3 can gradually transit to the propagation mode of the second optical waveguide of the $SiO_2$ core 5-2 while suppressing the transition to the substrate upper direction of propagation light whose MFD is enlarged by the tapered structure of the Si core 4b. Since the regions of the Si core 4a and the $SiO_2$ core 5-2 overlap each other in a cross-section perpendicular to the waveguide length direction, mismatching of modes can be reduced. As a result, the optical connection of the SiPh circuit 1 and the PLC 2 can be realized simply and with a low loss.

Figure 1A:
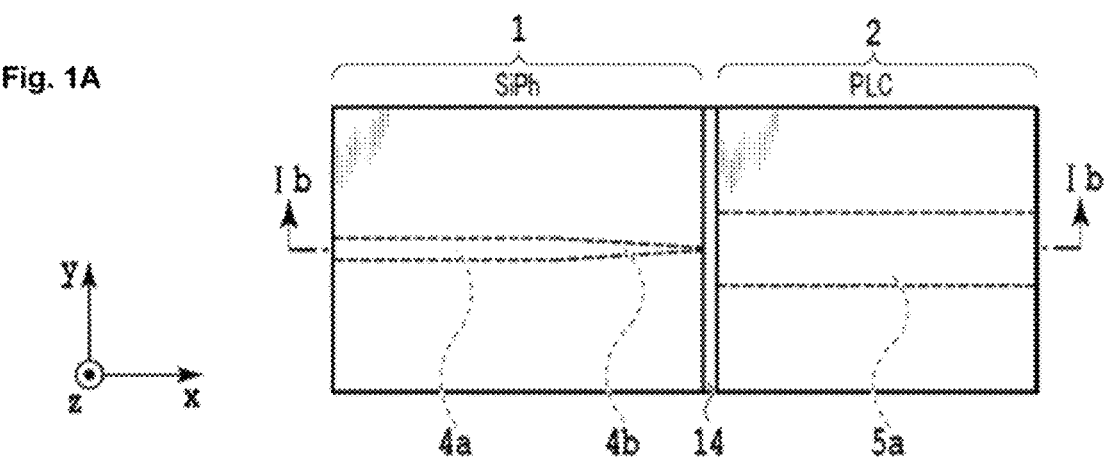
FIG. 1A is a top view of the substrate plane (x-y plane) of the optical circuit including the "butt coupling" and FIG. 1B is a cross-sectional view of the plane (x-z plane) which passes through the coupled optical waveguide (Ib-Ib line) and is perpendicular to the substrate plane.
Figure 1B:
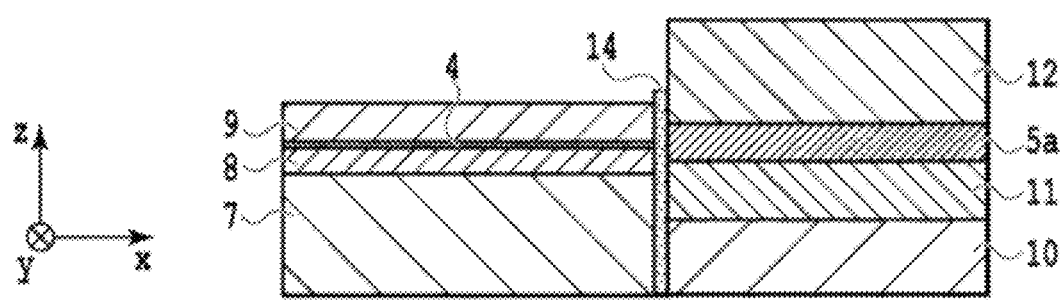
Figure 2:
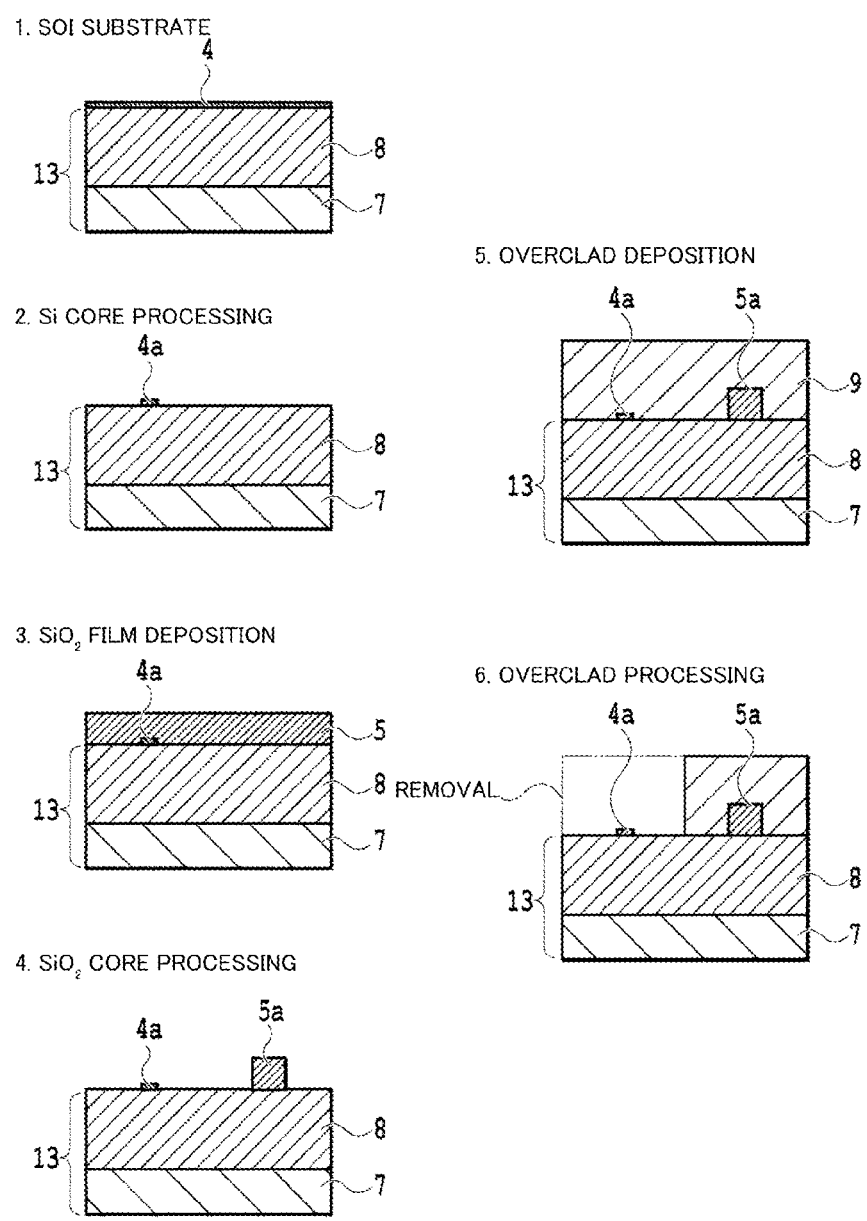
FIG. 2 is a diagram conceptually illustrating processes of monolithic integration for different optical circuits.

The procedure for manufacturing the optical waveguide component 100 shown in FIGS. 5A-5C is substantially the same as that for manufacturing the monolithic integrated optical circuit described in FIG. 2. In general, in PLC, an SiO₂ thin film is deposited on an Si or SiO₂ substrate as an underclad with 10 to 20 μm, a core with 3 to 10 μm, and an overclad with about 10 to 20 μm. In the optical waveguide component 100 of the present disclosure shown in FIGS. 5A-5C, the SOI substrate 13 can be used for the substrate 7, the underclad layers 8-1, 8-2, and the Si core 4. The SiO₂ thickness of the box layer forming the underclad layer is 10 to 20 μm, and the thickness of the Si layer forming the SOI layer is set to be 0.1 to 0.5 μm according to the design of the optical waveguide of the core. The Si cores 4a, 4b of the SiPh circuit 1 are processed by a process shown in FIG. 2 by using such an SOI substrate 13. Next, a step of the underclad layers 8-1, 8-2, and the protrusion 8-3 are formed. Thereafter, an SiO₂ layer to be an SiO₂ core of the PLC 2 is deposited, and an SiO₂ region 5 including the SiO₂ core 5-2 is processed. Finally, an SiO₂ layer 9 to be an overclad is deposited, so that the first optical circuit 1 composed of the Si core 4 and the second optical circuit 2 composed of the SiO₂ core 5-2 are integrated on the wafer of the SOI substrate 13.

Since the MED is matched in the optical connection part 3 of the SiPh circuit 1 and the PLC 2, various SSC structures such as gradually reducing the confinement effect of light on the SiPh circuit side and enlarging the MF can be utilized. In addition to the waveguide for narrowing the width of the Si core by the thin taper 4b as shown in FIGS. 5A-5C, a waveguide structure such as a segmented Si waveguide or the like can be provided. Similarly, various variations are possible for the tapered structure in the shape of the protrusion part 8-3 of the underclad. In the example of the protrusion 8-3 shown in FIGS. 5A-5C, as is apparent from the cross-sectional view of FIG. 5C, a simple structure which gradually narrows in the width direction (y direction) of the optical waveguide of the protrusion part 8-3 is used. The cross-sectional area of the rectangle of the underclad of the protrusion part 8-3 is gradually reduced toward the second optical circuit 2, so that the SiO₂ layer covers the optical circuit while lowering its height, and the vertical taper 5-3 is formed. If the effective cross-sectional area (density or occupancy rate) of the underclad of the protrusion part 8-3 can be gradually reduced toward the second optical circuit while the Si core 4b is manufactured halfway, the constitution of the protrusion part 8-3 can take various forms. For example, both sides of the protrusion part can be gradually lowered by forming them in a slope shape or can be lowered in a step shape. The other specific structure of the protrusion part will be described briefly as a modification in FIGS. 13A and 13B.

The SiO₂ core 5-2 of the PLC 2 is formed by depositing an SiO₂ layer on a wafer and processing it by etching or the like after forming the step and the protrusion of the underclad. By processing the SiO₂ deposition layer so as to cover and overlap the Si core 4a of the SiPh circuit 1, the SiO₂ core 5 is continuously configured along the Si core 4a on the SiPh circuit side beyond the boundary with the SiPh circuit. The SiO₂ layer deposited at this time has the same thickness in the PLC 2 and the SiPh circuit. In the optical connection part 3, the SiO₂ layer is deposited so that the height of the SiO₂ layer becomes lower as the width becomes gradually narrower due to the tapered structure of the protrusion part 8-3. The change in the height of the SiO₂ layer reflects the effect of reducing the deposition height in the projection of the small region compared with the projection of the large region when SiO₂ is deposited.

Referring to FIG. 5C, in the height of the upper surface of the SiO₂ core with reference to the height of the lower surface of the underclad 8-2, the height of the SiPh circuit 1 side (cross section A-A') becomes higher than that of the PLC2 side (cross section D-D'). In the middle, the height position of deposited SiO₂ is gradually lowered from the wide width of the protrusion part 8-3 in SiPh circuit 1 side to the narrow width in the PLC2 side (cross-section B-B'→cross section C-C') by the taper in the width direction of the protrusion part 8-3. The optical connection part 3 has a structure in which the height of the SiO₂ layer gradually decreases from the SiPh circuit 1 side toward the PLC 2 side, and SiO₂ layers 5-1, 5-2 of different heights are connected by a vertical tapered structure 5-3.

In the optical connection part 3, the light confinement effect is gradually weakened by the SSC structure of the thin taper 4b of the Si core, and at the same time, the Si core starts to be coupled to the SiO₂ core on the Si core in the vertical tapered structure 5-3. The height of the SiO₂ core gradually decreases as it approaches the PLC 2 side, and the occupancy rate of the SiO₂ core increases with respect to the protrusion part 8-3 of the underclad. On the contrary, the cross-sectional area of the protrusion part 8-3 is gradually reduced toward the second optical circuit (PLC 2). The propagation light of the Si core is gradually coupled to a mode formed by an SiO₂ core above the Si core and SiO₂ cores on both side surfaces of the protrusion part 8-3. The optical connection part 3 has a structure in which the ratio of the two constituent elements (the underclad 8-3 and the SiO₂ core 5-3) is gradually changed in the cross section, and the change in the direction perpendicular to the substrate (z-axis) at the MF center is reduced. In the optical connection part 3, butt coupling is performed transitionally while mode coupling is performed, and loss due to deviation of the MF center and mismatching of the MF can be reduced. At the same time, the center of the Si core and the center of the SiO₂ core in the direction perpendicular to the substrate can be smoothly matched.

As a secondary effect by the protrusion part 8-3 and the vertical tapered structure 5-3, the optical waveguide component 100 of the present disclosure also contributes to an increase in tolerance to a manufacturing error of the Si core width with respect to a variation in optical connection loss. Since the Si core 4b and the SiO₂ layer extended from the SiO₂ core 5-2 are overlapped in the optical connection part 3, the tolerance of the Si core width can be made larger compared with an adiabatic optical coupling structure optically connected by mode transition between the cores. For example, when the Si core width is increased due to manufacturing errors, the light confinement effect by the Si core is enhanced. Therefore, even if the SiO₂ core having a refractive index lower than that of the Si core is close to the SiO₂ core, mode transition between both waveguides is hardly caused. Therefore, the mode transition is not performed as designed in the structure of the adiabatic coupling. As a result, mismatching of the MF center occurs between the MF of the optical connection part and the MF of the SiPh or PLC side optical waveguide, and optical connection loss occurs.

On the other hand, in the optical waveguide component 100 of the present disclosure, the Si core 4b is gradually covered with the SiO₂ layer by a protrusion part 8-3 and a corresponding vertical tapered structure 5-3 toward the PLC 2 side. In this structure, the centers of the MF composed of the Si core and the MF composed of the SiO₂ core are close to each other, and even when the confinement of light by the Si core is strong, the optical connection loss due to the mismatching of the MF center is reduced. Therefore, variation in optical connection loss due to manufacturing error of the Si core width is suppressed, leading to expansion of tolerance.

The height of the protrusion part 8-3 in the perpendicular direction of the substrate (z direction) from the low surface of the underclad 8-2 is preferably set to a value obtained by subtracting a half of the thickness of the Si core from a half of the thickness of the $SiO_2$ core. By setting the height of the protrusion part 8-3 in this way, the MF center of the light propagating through the Si cores 4a, 4b and the MF center propagating through the $SiO_2$ core 5-2 match with each other.

When the structure of the protrusion part 8-3 is finished at the tip of the SSC structure by the thin taper 4b of the Si core, the height of the $SiO_2$ core is largely changed before and after the tip of the thin taper 4b. In order to avoid a sudden change in the height of the $SiO_2$ core, the protrusion part 8-3 is provided with a non-overlapping region extending further to the PLC 2 side than the tip of the thin taper 4b of the Si core, and it is desirable that the width of the non-overlapping region is narrowed in a tapered shape. In the protrusion part 8-3 shown in FIG. 5A, the overlapping region and the non-overlapping region are continuously integrated, and the entire protrusion part 8-3 has a simple tapered shape. The overlapping region and the non-overlapping region are called by distinguishing between before and after the end point of the Si core for convenience, and it means that the Si core is finished in the middle of the protrusion part 8-3 in the waveguide length direction.

When the width of the protrusion part 8-3 is approximately the same as that of the Si cores 4a, 4b, the side face of the Si core is especially exposed at the time of processing the protrusion part 8-3, and damage such as surface roughness may be caused to affect the propagation characteristics. It is desirable that the width of the protrusion part 8-3 in the horizontal direction of the substrate is larger than the width of the Si cores 4a, 4b, and thereby the damage to the Si core at the time of processing the protrusion part 8-3 is suppressed.

In the above description, the effect of suppressing the optical connection loss has been described by taking a structure in which the Si core 4 of the optical waveguide of the first optical circuit and the $SiO_2$ core 5-2 of the optical waveguide of the second optical circuit are optically connected on a common single substrate as an example. However, the effect of the configuration of the optical waveguide component 100 of the present disclosure is not limited to specific materials. Even when Si, SiN, and SiON are used as a first core composed of a first material having a high refractive index, and $SiO_2$, $SiO_x$, polymer, and the like are used as a second core composed of a second material having a lower refractive index than that of the first material, the same effect of suppressing optical connection loss can be realized.

The present invention also has aspects of a method of manufacturing the optical waveguide component for optically connecting optical waveguides composed of different materials. By the following manufacturing method, the structure of the optical waveguide component for optically connecting the optical waveguide of the first optical circuit and the optical waveguide of the second optical circuit is manufactured. The outline of the manufacturing method is composed of the following processes.

The first process is a step for forming first cores 4a, 4b composed of the first material on the substrate 13 provided with the underclad layer. At the same time, the tapered structure of the first core in the optical connection part 3 is also formed. The first core may be the Si core. In addition, an SOI substrate can be used as the substrate 13.

The second process is a step for processing the underclad layer and forming the high-level surface of the underclad 8-1 corresponding to the first optical circuit 1, a low-level surface of the underclad 8-2 corresponding to the second optical circuit 2, and a protrusion part 8-3 extending along the first core 4b from the high-level surface toward the second optical circuit. At this time, a step structure of the underclad and a taper structure of the protrusion part 8-3 are formed. In the case of a protrusion part having a more complicated structure as described later, another process may be added.

The third step is a step for depositing the core layer of the second material having a refractive index lower than that of the first material on the processed underclad layer. The second material may be, for example, an $SiO_2$ film. In this process, a structure in which the height of the core layer gradually decreases toward the second optical circuit is formed at a place where the vertical tapered structure is formed later. This structure is due to the effect that the deposition height is reduced in the projection of a smaller region than in the projection of a larger region when the core layer of the second material is deposited.

The fourth process is a step for processing the deposited core layer, forming the second core 5-1, 5-2, and 5-3 from the first optical circuit 1 to the second optical circuit 2, making the configuration in which the first core region is included in the second core region in a cross section perpendicular to the length direction of the optical waveguide of the second core, and forming the vertical tapered structure 5-3 in which the height of the second core is decreased from the first optical circuit 1 toward the second optical circuit 2. In this process, a vertical tapered structure 5-3 is formed by the second core corresponding to the protrusion part 8-3 of the underclad.

Finally, the overclad layer 9 covering the second core and the entire underclad is formed to manufacture the optical waveguide component including the optical connection part 3.

As described above, the optical waveguide component of the present disclosure monolithically integrates the SiPh circuit 1 and the PLC 2 on one substrate using the SOI substrate. In an optical connection part between the Si optical waveguide and the $SiO_2$ optical waveguide, a step having a high-level surface and a low-level surface is provided in a box layer composed of $SiO_2$ as an underclad. Further, a protrusion part of an underclad is formed from the high-level surface side of the step to the low-level surface side along the Si waveguide, and a width direction taper of the protrusion part is provided from the Si optical waveguide to the $SiO_2$ optical waveguide. In the optical connection part, a vertical tapered structure is further formed in which the height in the substrate thickness direction of the $SiO_2$ film deposited on the optical connection part is gradually reduced corresponding to the taper in the width direction of the protrusion part.

The center of gravity of the $SiO_2$ core can be gradually brought close to the center of the Si core by the vertical tapered structure corresponding to the protrusion part. The deviation between the MF center of the light propagating through the Si optical waveguide and the MF center of the light propagating through the $SiO_2$ optical waveguide in the optical connection part is suppressed, and loss due to mismatching of the MF center can be reduced. At the same time, the Si core is gradually covered with the $SiO_2$ core, so that MFD conversion from the Si optical waveguide to the SiO$_2$ optical waveguide can be realized with low loss. By providing the configuration of the optical connection part 3, the optical waveguide component capable of realizing optical connection with low loss and high accuracy on one substrate in a small size can be provided. A specific example of the optical component based on the configuration of the optical waveguide component of the present invention shown in FIGS. 5A-5C will be described below.

Example 1

Figure 6:
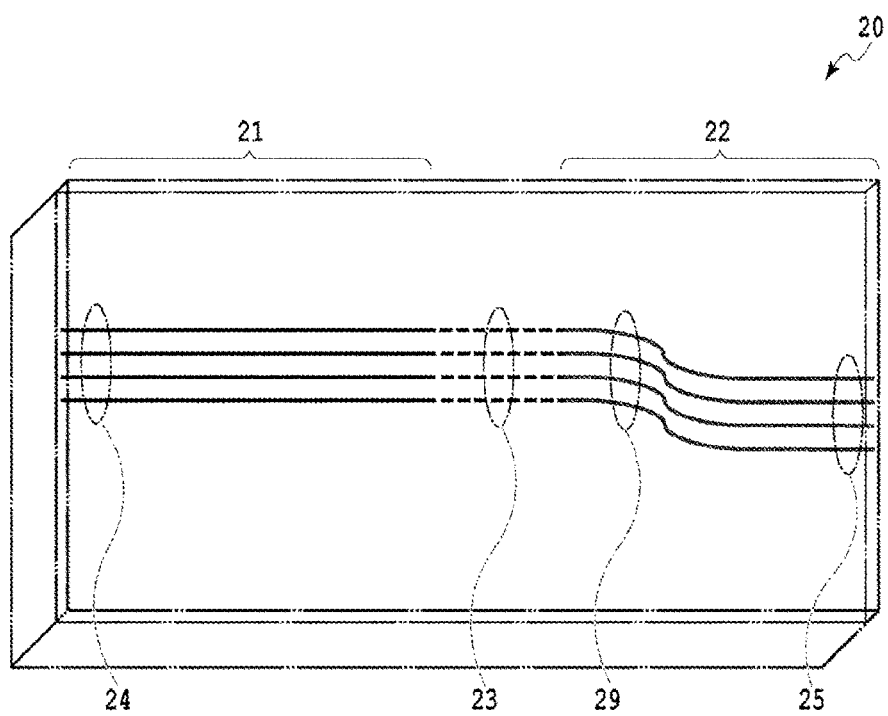
FIG. 6 is a diagram showing an Example 1 of the optical circuit including the optical waveguide component of the present disclosure.

FIG. 6 is a diagram showing a configuration of Example 1 of an optical circuit including an optical waveguide component of the present disclosure. An optical circuit 20 of FIG. 6 includes a plurality of input optical waveguides 24 of signal light composed of Si cores, a plurality of output waveguides 25 of signal light composed of corresponding SiO$_2$ cores, and optical connection parts 23. By using such the optical circuit 20, the optical connection loss in the optical connection parts 23 is evaluated, and the effect of reducing the optical connection n loss is verified. First, the structure of each part of the optical circuit 20 is shown.

In the chip of FIG. 6 which is the optical circuit 20, the size is 5 mm in length and 10 mm in width, and the Si optical waveguide 24 of the SiPh circuit and the SiO$_2$ optical waveguide 25 of the PLC are integrated. The signal light is inputted from the Si optical waveguide 24 of an input optical waveguide provided on the short side of the chip. The output of the signal light is performed by the output waveguide 25 formed on the opposite short side (PLC side) of the chip to the Si optical waveguide 24. Four input optical waveguides 24 are provided at a pitch of 250 µm, and each from the optical input part to the optical connection part 23 is composed of an Si optical waveguide, and each from the optical connection part 23 to the optical output part is composed of an SiO$_2$ optical waveguide. An S-shaped waveguide structure is provided between the optical connection part 23 and the optical output part.

The Si optical waveguide 24 and the SiO$_2$ optical waveguide 25 have the following structures. In an SOI substrate configuring a chip, a film thickness of a box layer of SiO$_2$ serving as an underclad is 15 µm, and a thickness of an SOI layer of Si serving as an Si core is 0.22 µm. The Si core is formed by processing the Si layer with a width of 0.5 µm by photolithography and etching, and the Si layer is removed by etching even in a region where the PLC is to be formed.

Next, as a pre-stage of forming the SiO$_2$ core of the PLC, 2.<10614 µm etching for the underclad is performed in a region where the PLC is to be formed. In this etching process, the high-level surface, the low-level surface, and the protrusion part of the underclad are formed. In the case of a more complicated structure of the protrusion part as described later with reference to FIGS. 13A and 13B, some additional processing processes may be performed. Next, an SiO$_2$ film to be an SiO$_2$ core is deposited on the substrate with 4.5 µm by a method such as CVD or sputtering. Thereafter, photolithography and etching are performed to form a SiO$_2$ core with 4.5 µm height and width. Further, an SiO$_2$ layer to be the overclad of the SiPh circuit and the PLC is deposited with 14.5 µm to form the Si optical waveguide and the SiO$_2$ optical waveguide. At this time, Ge or the like is doped to the SiO$_2$ core on the PLC side, so that the optical waveguide in which the refractive index difference between the core and the clad is 2.0% is configured.

Figure 7A:
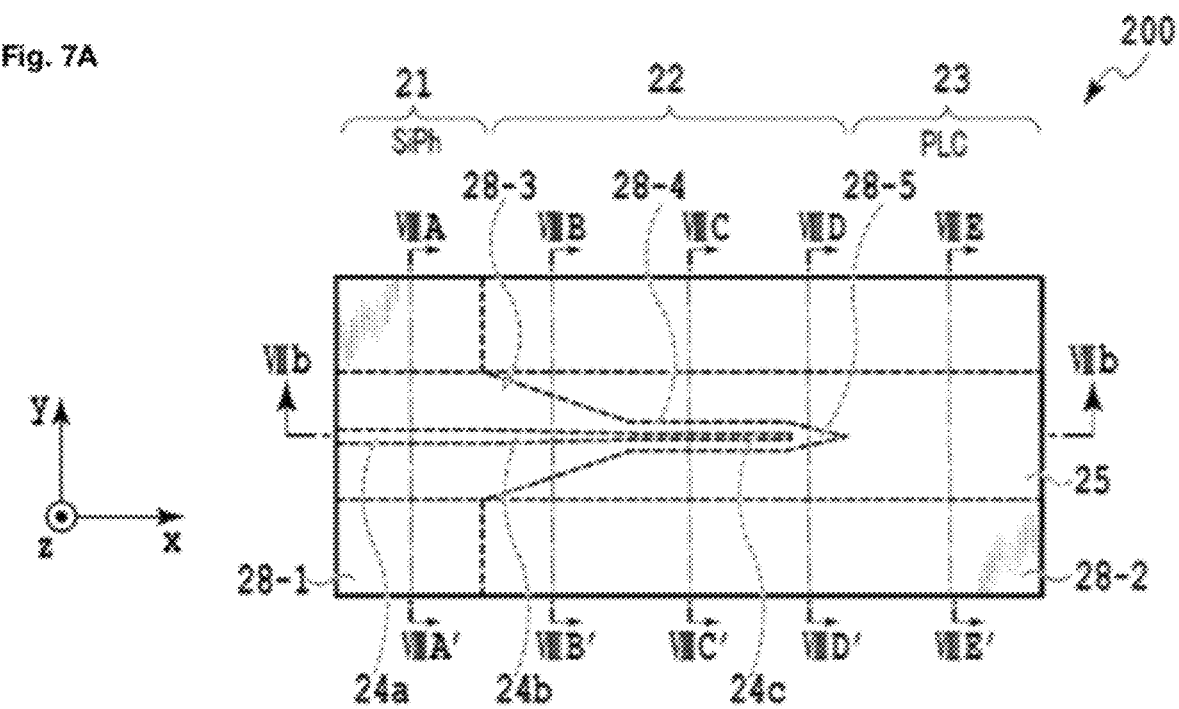
FIG. 7A is a top view of the substrate plane (x-y plane) of the optical waveguide component and FIG. 7B is a side view of a cross section (x-z plane) which passes the center of the two optical waveguides.
Figure 7B:
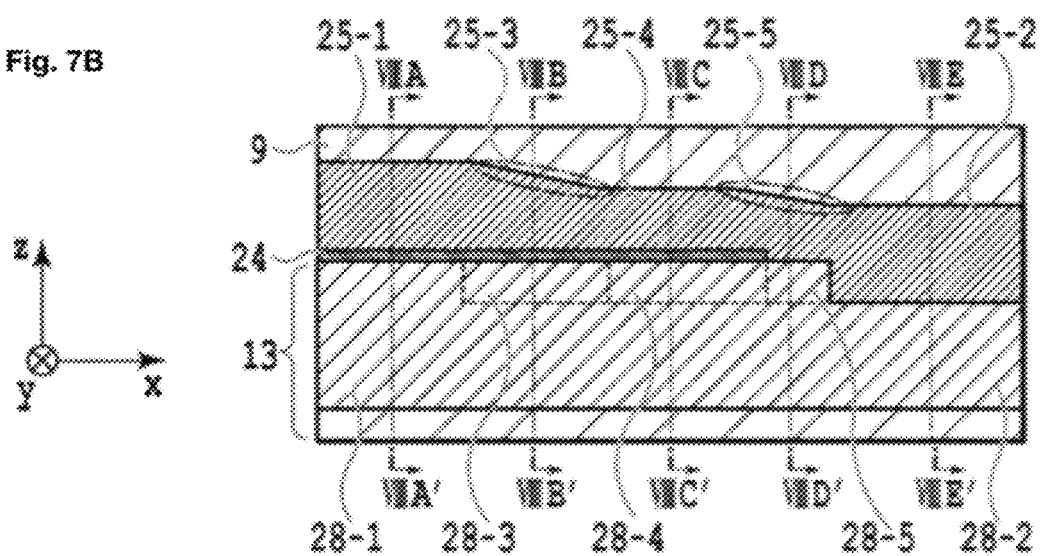

FIGS. 7A and 7B are diagrams diagram showing a configuration of an optical connection part of the optical circuit of Example 1. It should be noted that the optical waveguide component 200 shown in FIGS. 7A and 7B corresponds to the vicinity of the optical connection part 23 of the optical circuit shown in FIG. 6, and a part of the optical circuit shown in FIG. 6 is cut out and shown. FIG. 7A is a top view of the substrate plane (x-y plane) of the optical waveguide component 200, and FIG. 7B is a side view of a cross section (x-z plane) which passes the center of the two optical waveguides (VIIb-VIIb line).

Figure 8:
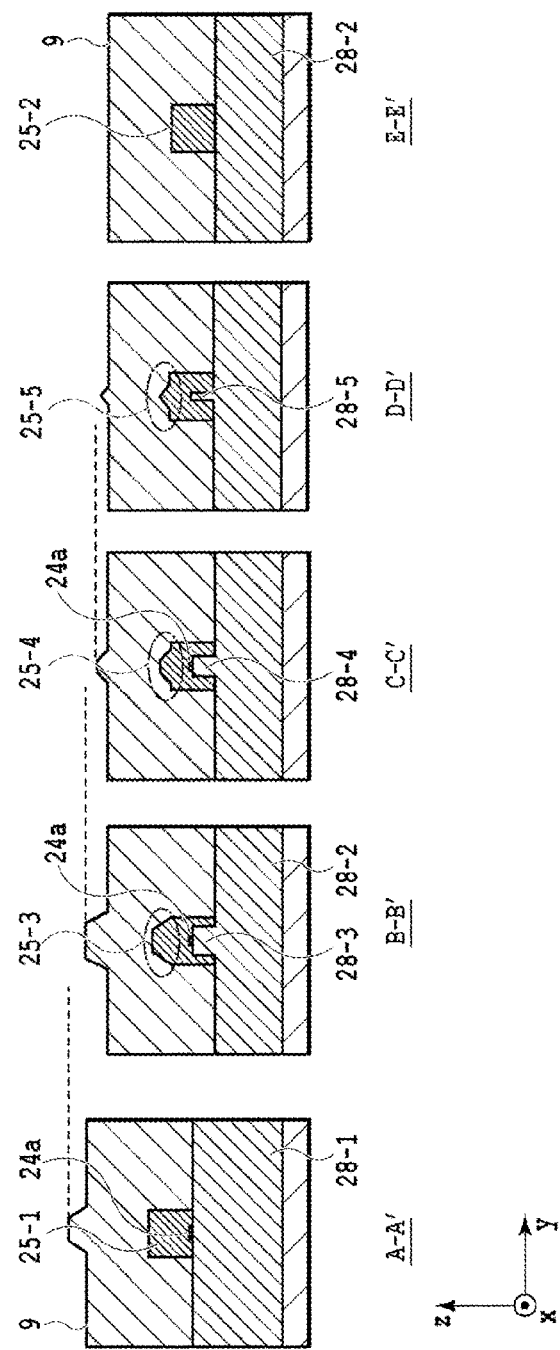
FIG. 8 is a diagram showing the cross-sectional configuration of each part of the optical connection part of the optical waveguide component of Example 1.

FIG. 8 is a cross-sectional view, which is obtained by cutting the plane (y-z plane) perpendicular to the length direction, at different positions of the optical connection part of the optical waveguide component of Example 1. FIGS. 7A, 7B and 8 show the optical connection part 23 between the first optical circuit 21 (SiPh) and the second optical circuit 22 (PLC), and the five cross sections of FIGS. 7A and 7B correspond to the respective cross sections of FIG. 8. Referring to FIGS. 7A, 7B and 8, description will be made below with focusing on the difference between the optical connection part of Example 1 and the optical connection part of the basic structure shown in FIGS. 5A-5C.

The configuration difference between the optical waveguide component shown in FIGS. 5A-5C and 7A-7B is the configuration of the protrusion part formed extending from the high-level surface of the underclads 28-1, 28-2. Although the protrusion part 8-3 of FIGS. 5A, 5B, and 5C has a simple tapered shape, the protrusion of this example consists of three continuous parts 28-3, 28-4 and 28-5, and has a generally rocket-like shape in the top view of FIG. 7A. The protrusion part is provided with a tapered first part 28-3, a linear second part 28-4, and a tapered third part 28-5, so that the width is gradually narrowed toward the PLC side. The Si core optical waveguide includes a thin taper 24-b at the tapered first part 28-3, and a thinner Si core 24c of a constant width at the linear second part 28-4. Note that the configuration of the protrusion part shown in FIG. 8 can be seen that the second portion 28-4 is inserted in the middle of the taper of the protrusion part 8-3 shown in FIGS. 5A-5C.

Referring to FIG. 7B, vertical tapered structures 25-3 and 25-5 by the SiO$_2$ layers are formed at the tapered first part 28-3 and the tapered third part 28-5 of the protrusion part, respectively. When the whole of the protrusion part is viewed, it can be seen that the height of the continuously formed SiO$_2$ film region 25 is gradually lowered from the first optical circuit (SiPh circuit) to the second optical circuit (PLC). Referring to from the cross section VIIIA-VIIIA' to the cross section VIIIE-VIIIE' of FIG. 8, it can be seen that the height of the SiO$_2$ film region 25 is gradually lowered from the SiO$_2$ region 25-1 (cross-section VIIIA-VIIIA') to the SiO$_2$ optical waveguide 25-2 (cross section VIIIE-VIIIE'). The other structure is the same as that of the optical waveguide component 100 shown in FIGS. 5A, 5B, and 5C except for the difference in the structure of the above-mentioned protrusion part in the optical connection part 23. Hereinbelow, a specific configuration will be described.

In the first part 28-3 of the protrusion part, the width of the Si optical waveguide 24b is gradually narrowed as the tapered part 24b from 0.5 µm to 0.2 µm by taking a distance of<12 300 µm. Subsequently, in the second part 28-4 of the protrusion part an SSC structure is formed by extending the straight line part 24c of 0.2 µm width by 300 µm. In this way, in a structure in which the shape of the Si optical waveguide is changed in two stages of the tapered part 24b and the linear part 24c, the effect so as to stabilize the propagation state of the light which propagates through the extended waveguide and whose MF is enlarged by the tapered part 24b can be obtained.

Three parts of the protrusion part are formed corresponding to the tapered structure of the Si core. The first part 28-3 of the protrusion part is formed so that the width is 4.5 μm at a start position of the taper part 24b of the Si core, the wi5 μm at an end position, and the width is gradually narrowed in a tapered shape. In the linear part 24c of the Si core, the second part 28-4 of the protrusion part is extended while maintaining a width of 1.5 μm along the linear part 24c of the Si core. Further, the taper of the third part 28-5 of the protrusion part is extended by 100 μm even after the end of the straight part 24c of the Si core, and the end is finished by narrowing the tip in a tapered shape.

The formation of the protrusion part 28-3 to 28-5 in the optical connection part 23 of Example 1 is also performed by photolithography and etching, and it is desirable that the width of the protrusion part 28-3 to 28-5 is larger than the width of the Si optical waveguide so as not to cause damage to the Si optical waveguides 24b and 24c by etching. The SSC structure of the Si optical waveguides 24b, 24c is preferably a thin taper shape so as to match the change of the taper width of the protrusion part 28-3 to 28-5.

Since the center height of the core 24a of the Si optical waveguide is formed to match that of the core 25-2 of the SiO$_2$ optical waveguide, the height of the protrusion part 28-3 to 28-5 from the low-level surface is set to a value obtained by subtracting a half of the thickness of the Si core 24 from a half of the thickness of the SiO$_2$ core 25-2. In the configuration example of Example 1 shown in FIGS. 7A, 7B and 8, the height of the protrusion from the lower surface is set to 2.14 μm (4.5 μm/2-0.22 μm/2). At this time, the upper surface of the protrusion part matches the bottom surface of the Si core 4 (the high-level surface of underclad) and the height of the bottom of the protrusion part matches the bottom surface of the SiO$_2$ core (the low-level surface of underclad). By making the heights of the centers of the Si core 24 and the SiO$_2$ core 24-2 equal, the optical fiber array and the chip 20 can be stably connected. For example, when the Si core is used as one input and output waveguide, the SiO$_2$ core is used as the other input and output waveguide and each input and output waveguide is arranged at the chip end face as shown in FIG. 6, the chip end face and the array fiber are connected without eccentricity, and optical connection loss due to eccentricity can be reduced.

It is preferable to provide the thin taper gradually narrowing the width up to a position extended from the end of the straight line part 24c of the Si core in the third part 28-5 where the protrusion part is finished. By the tapered structure of the third part 28-5, the height of the SiO$_2$ core in the direction perpendicular to the substrate (z direction) is prevented from being suddenly changed, and reflection loss due to the sudden change of the SiO$_2$ core shape at the final part of the protrusion part can be suppressed. The SiO$_2$ region has a width of 4.5 μm and the region from the SiO$_2$ region 25-1 on the Si core of the first optical circuit to the SiO$_2$ core 25-2 of the second optical circuit 21 are continuously and integrally formed.

The height of the SiO$_2$ region of the first part 28-3 where the protrusion part started was 6.64 μm with reference to the low-level surface of the protrusion part (the upper surface of the underclad 28-2). The height of the SiO$_2$ region was gradually lowered as the width of the first part 28-3 of the protrusion part became narrower (cross-section VIIIB-VIIIB'), and the height was 5.5 μm where the width of the protrusion part was 1.5 μm (cross-section VIIIC-VIIIC'). In the third part 28-5 where the width of the protrusion part was narrowed again and the protrusion part was finished, the height of the SiO$_2$ region was further lowered (cross-section VIIID-VIIID') and the height of the SiO$_2$ core 25-2 was 4.5 μm (cross-section VIIIE-VIIIE'). In this way, the vertical tapered structures 25-3 to 25-5 in which the height of the SiO$_2$ region from the start to the end of the protrusion part is gradually lowered from 6.64 μm to 4.5 μm are formed by the protrusion part 28-3 to 28-5 including the tapered structure for gradually narrowing the width. It can be seen that the structure similar to that of the basic structure of the optical connection part shown in FIGS. 5A-5C is realized by the protrusion part and the vertical tapered structure of the optical waveguide component shown in FIGS. 7A, 7B and 8.

The light with 1.55 μm wavelength was input to the optical circuit 20 of Example 1 from the SiPh side by the optical fiber and the light intensity was measured for each channel by a power meter when the light output from PLC side was coupled with the other optical fibers and the insertion loss was evaluated. For comparison with Example 1, two kinds of optical circuits different in only the structure of the optical connection part were separately manufactured. One was the monolithic integration having no underclad step shown in FIGS. 3A and 3B, and the other was the monolithic integration having the underclad step shown in FIGS. 4A and 4B. Separately from these, a test optical circuit constituted only of the Si optical waveguide and a test optical circuit constituted only of the SiO$_2$ optical waveguide ware manufactured. From these, the connection loss with the optical fiber and the propagation loss of the Si optical waveguide and the SiO$_2$ optical waveguide were evaluated, and these values are subtracted and the coupling loss of only the optical connection part was calculated.

Figure 3A:
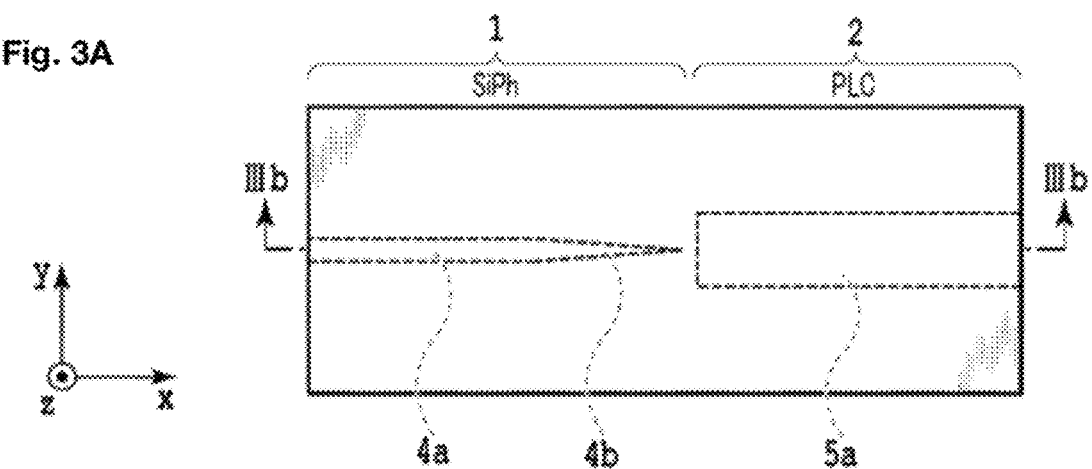
FIG. 3A is a diagram illustrating an optical waveguide center deviation of a monolithic integrated optical circuit and FIG. 3B is a cross-sectional view of the plane (x-z plane) which passes through the optical waveguide (IIIb-IIIb line) and is perpendicular to the substrate plane.
Figure 3B:
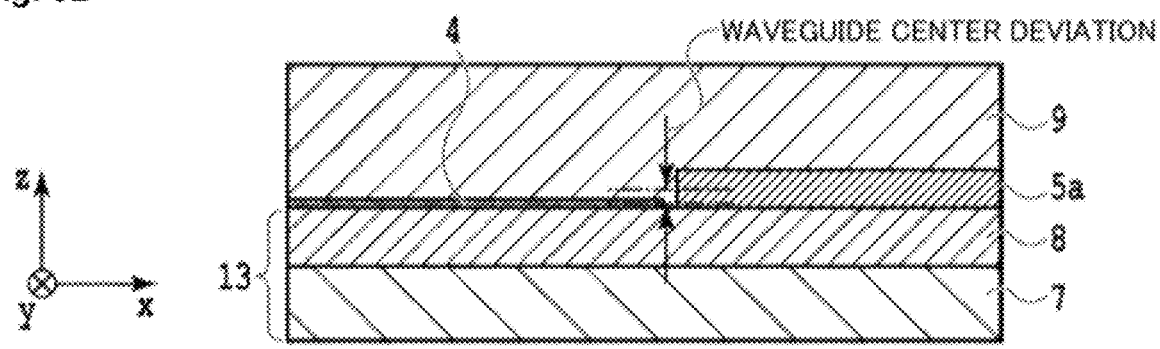

In the three kinds of optical connection parts, the structure of the optical circuit having no underclad step shown in FIGS. 3A and 3B has the largest loss and the loss is 5.7 dB. On the other hand, the loss of the structure of the optical circuit having the underclad step shown in FIGS. 4A and 4B was reduced up to 0.85 dB, however it was seen that loss was caused by mismatching of the MF center. In the optical circuit 20 including the optical waveguide component of the present disclosure shown in FIGS. 7A and 7B, the loss of the optical connection part was 0.7 dB and it was confirmed that the loss was smaller than that of the configuration of FIGS. 4A and 4B. In the configuration shown in FIGS. 4A and 4B of the prior art, there remained a loss caused by mismatching of MED in optical connection from a small MFD of the Si optical waveguide to a large MED of the SiO$_2$ waveguide. In the optical circuit 20 shown in FIGS. 7A and 7B, the SiO$_2$ core gradually covers the Si optical waveguide in the optical connection part, thereby reducing the mismatching of the MED size. Further, it is considered that the deviation between the MF center of the light propagating through the Si optical waveguide and the MF center of the light propagating through the SiO$_2$ waveguide is suppressed by the tapered structure of the protrusion part from the high-level surface of the underclad and the vertical tapered structure of the SiO$_2$ film covering the taper structure. It was confirmed by the structure of the optical connection part of the optical waveguide component of the present embodiment that the optical connection of the optical waveguide component of the present disclosure with a low loss can be realized by a simple structure and a simple manufacturing method.

Example 2

Figure 9:
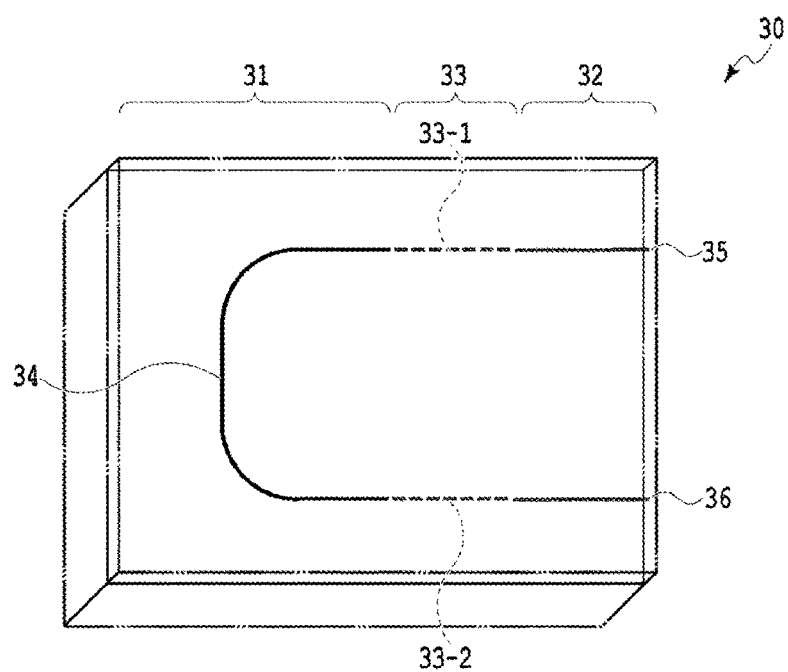
FIG. 9 is a diagram showing a configuration of an example 2 of an optical circuit including the optical waveguide component of the present disclosure.

FIG. 9 is a diagram showing a configuration of Example 2 of an optical circuit including the optical waveguide component of the present disclosure. The optical circuit 30 shown in FIG. 9 includes an optical waveguide 35 for input of signal light consisting of an SiO$_2$ core provided on one short side of a chip, a bent waveguide 34 consisting of a corresponding Si core, and an optical waveguide 36 for output consisting of an SiO$_2$ core provided on the same short side. The two SiO$_2$ cores are connected by two optical connection parts 33-1, 33-2. By using such an optical circuit 30, the optical connection loss in the two optical connection parts 33 was evaluated, and the effect of reducing the optical connection loss was verified. First, the structure of each part of the optical circuit 30 is shown.

The chip to be the optical circuit 30 has a size of 5 mm in the vertical direction and 7 mm in the horizontal direction, and the Si optical waveguide 34 of the SiPh circuit and the SiO$_2$ optical waveguides 35, 36 of the PLC are monolithically integrated. The optical input is performed from an SiO$_2$ waveguide 35 provided on the short side of the chip, and the optical output part is formed on the end face of the same short side as the input part. A part from the input optical waveguide 35 of the SiO$_2$ core to the first optical connection part 33-1 is constituted of the SiO$_2$ waveguide, and a part from the first optical connection part 33-1 on the input side to the second optical connection part 33-2 on the output side through the bent waveguide 34 is constituted of the Si optical waveguide. Finally, a part from the second optical connection part 33-2 to the optical output part is constituted again of the SiO$_2$ optical waveguide.

The Si optical waveguide and the SiO$_2$ optical waveguide have the following structures. In an SOI substrate constituting the chip, a film thickness of a box layer of SiO$_2$ serving as an underclad is 15 μm, and an SOI layer of Si serving as an Si core is 0.22 μm. The Si core is formed by processing the Si layer with a width of 0.5 μm by photolithography and etching, and the Si layer is removed by etching even in a region where the PLC is to be formed.

Next, as a pre-stage of forming the SiO$_2$ core of the PLC, an underclad is etched for 2.14 μm in a region where the PLC is to be formed. In this etching process, a high-level surface and a low-level surface of the underclad and a protrusion part shown in FIGS. 5A, 5B, and 5C are formed. In the case of a protrusion part having a more complicated structure as described later with reference to FIGS. 13A and 13B, some processing processes may be further carried out.

Next, the SiO$_2$ film to be the SiO$_2$ core is deposited for 4.5 μm on the substrate by a method such as CVD or sputtering. Thereafter, photolithography and etching are performed and the SiO$_2$ core with the 4.5 μm height and width is formed. Further, the SiO$_2$ layer to be the overclad of the SiPh circuit and the PLC is deposited on the substrate for 14.5 μm and the Si optical waveguide 24 and the SiO$_2$ optical waveguide are formed. At this time, Ge or the like is doped to the SiO$_2$ core on the PLC side, so that the optical waveguide in which the refractive index difference between the core and the clad is 2.0% is configured.

Figure 10A:
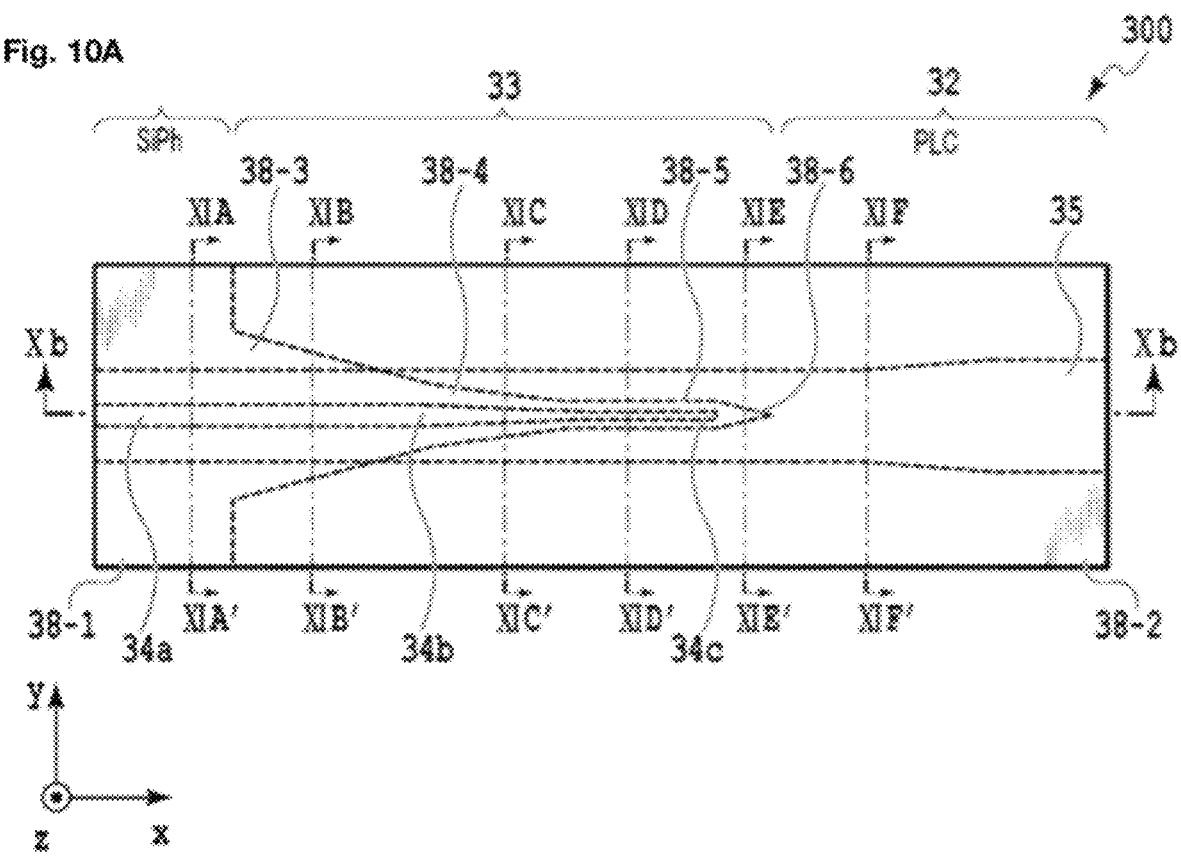
FIG. 10A is a top view of the substrate plane (x-y plane) of the optical waveguide component of example 2 and FIG. 10B is a side view of a cross section (x-z plane) passing through a center of two optical waveguides.
Figure 10B:
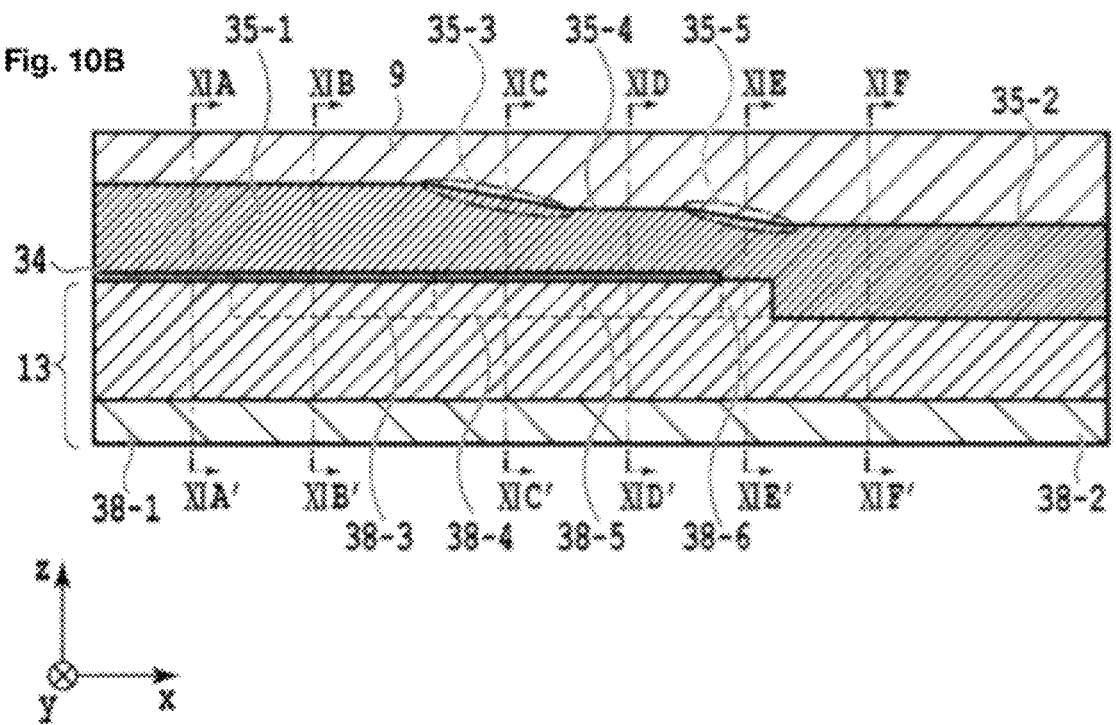

FIGS. 10A and 10B are diagrams showing a configuration of the optical connection part of the optical circuit of Example 2. It should be noted that the optical waveguide component 300 shown in FIGS. 10A and 10B corresponds to the respective structures of the optical connection parts 33-1, 33-2 of the optical circuit 30 shown in FIG. 9, and a part of the optical circuit 30 is cut out and shown. FIG. 10A is a top view of the substrate plane (x-y plane) of the optical waveguide component 300, and FIG. 10B is a side view of a cross section (x-z plane) passing through a center of two optical waveguides (Xb-Xb line).

Figure 11:
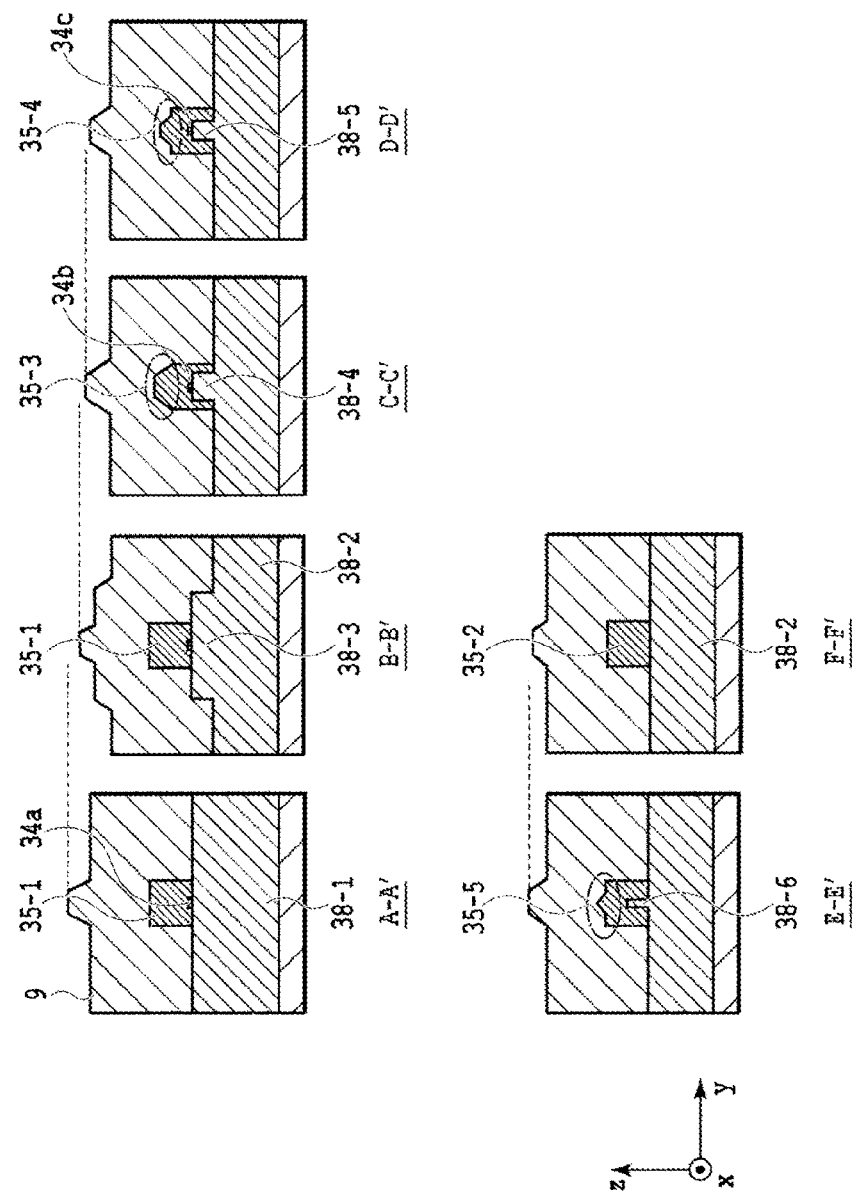
FIG. 11 is a diagram showing a configuration of a cross-section of each part of the optical waveguide component of example 2.

FIG. 11 is a cross-sectional view of the optical connection part of the optical waveguide component of Example 2, which is obtained by cutting the plane perpendicular to the length direction (y-z plane) at different positions. FIGS. 10A, 10B and 11 show the optical connection part 33 between the first optical circuit 31 (SiPh) and the second optical circuit 32 (PLC) and the six cross-section lines shown in FIGS. 10A and 10B correspond to each cross-section (A-A' to F-F') shown in FIGS. 10A, 10B and 11. Referring to FIGS. 10A, 10B and 11, description will be made below with focusing on the differences between the optical connection part in the optical circuit 30 of Example 2 and the basic structure of the optical connection part shown in FIGS. 5A and 5B and the optical connection part of Example 1 shown in FIGS. 7A and 7B.

The optical waveguide component shown in FIGS. 10A and 10B differs from the optical waveguide components shown in FIGS. 5A-5C and 7A-7B in terms of the structure of a protrusion part formed extending from the high-level surface of the underclads 38-1 and 38-2. The protrusion part of the present example is obtained by gradually changing the structure of the optical connection part of Example 1 in more multiple stage-wise. The protrusion part is composed of four continuous parts 38-3 to 38-6, the width is more smoothly changed than the structure of the protrusion part of Example 1 and the corresponding height of the vertical tapered structure is lowered with two stages. The protrusion part is provided with the tapered first part 38-3, the tapered second part 38-4, the linear third part 38-5, and the tapered fourth part 38-6 and having the structure in which the width is narrowed stage-wise toward the PLC side.

In the optical connection part 33, the Si core optical waveguide extending from the first optical circuit 31 is also gradually changed multiple stage-wise as described below with correspondence to the structure of each part of the protrusion part. In the tapered first part 38-3, the same width as the Si core 34a of the first optical circuit is extended as it is. In the tapered second part 38-4 the Si core becomes the thin taper 34b, and in the following linear third part 38-4 the Si core 34c has a narrower constant width. The Si core 34c is finished at the start position of the last tapered fourth part 38-6.

The SiO$_2$ core 35-2 of the second optical circuit 33 is formed by extending from the second optical circuit so as to completely cover the Si core of the first optical circuit 31 and the optical connection part 33, and is formed as an integrated SiO$_2$ core region 35 as shown in the top view of FIG. 10A. The vertical tapered structure 35-3 is formed substantially corresponding to the first part 38-4 and the second part 38-4 which are tapered in the protrusion part, and the vertical tapered structure 35-5 is formed substantially corresponding to the fourth part 38-6. FIG. 10B shows that the height of the vertical tapered structure of the SiO$_2$ core region rapidly changes at the boundary of each part. However, it should be noted that in practice, the height of the SiO$_2$ core region changes smoothly as shown in cross section A-A to cross-section F-F of FIG. 11 corresponding to the narrowing of the width of the protrusion part.

The optical connection part 33 between the SiPh and the PLC in the optical waveguide component 300 shown in FIGS. 10A, 10B and 11 is specifically configured as follows. In the Si optical waveguide, the width at the second part 38-4 of the optical connection part 33 is narrowed in a tapered shape from 0.5 μm to 0.2 μm cross a length of 200 μm. Further, SSC structure is formed by extending the width from 0.2 μm to 200 μm in the third part 38-5.

The width of the protrusion part from the high-level surface of the underclad 38-1 is configured to be narrowed in three stages by the taper of three parts. First, in the first part 38-3 of the protrusion part, the width is gradually narrowed from a width wider than the width of the SiO$_2$ core 35-1, and in a second part 38-4, the width is further narrowed. The width of the protrusion part is gradually narrowed as a whole by narrowing the width of the protrusion part to the tip again at the fourth part 38-6 through the third part 38-5 having the same width. The specific sizes of each part of the protrusion part are as follows. The first part 38-3 of the protrusion part has the width of 5.0 μm on the thick taper side, the width of 2.5 μm on the thin taper side, and the length of 250 μm. The second part 38-4 has the width of 2.5 μm on the thick taper side, the width of 1.25 μm on the thin taper side, and the length of 200 μm. The fourth part 38-6 has the width of 1.25 μm on the thick taper side, the tip is narrowed down to the width of 0 μm and terminated, and the length of 100 μm. The third part 38-5 maintains the same width of 1.25 μm, and has the length of 200 μm.

The taper is provided at the first part 38-3 of the protrusion part, and the width is changed from a wider width than that of the SiO$_2$ core 35-1 to a narrow width to suppress a sudden change in the film thickness of the SiO$_2$ core 35-1 and the overclad 9 on the Si core 34a from the cross-section A-A' to C-C'. Even if the width of the SiO$_2$ core 35-1 is somewhat thicker than a design value due to a manufacturing error, the vertical tapered structure can be provided in the SiO$_2$ core by the length of the design from the second part 38-4 to the fourth part 38-6, and manufacturing tolerance is improved.

The width of the SiO$_2$ core 35-2 of the second optical circuit 32 is 4.5 μm on the PLC side, however the width of that is narrowed to 3.5 μm by the taper with the length of 300 μm on the optical connection part 33, and that is extended to the second optical circuit 31 (SiPh circuit) side. The MFD of the propagation light is reduced by slightly narrowing the SiO$_2$ core width in the optical connection part 33, and the matching with the MFD of the propagation light in the SSC structure of the optical waveguides of the Si cores 34b and 34c is improved. In order to obtain the effect of the protrusion part and the corresponding vertical tapered structure in the optical waveguide component of the present disclosure, it is preferable that the width of the second part 38-4 of the protrusion part is narrower than the width of the SiO$_2$ core regions 35-1 to 35-5. Thus, when viewed in a cross-section perpendicular to the length direction of the optical waveguide, the cross-sectional region of the second part 38-4 to the fourth part 38-6 of the protrusion part is also included in the cross-sectional region of the SiO$_2$ core constituted by extending from the second optical circuit.

At this time, when the cross section of the protrusion part is noticed, the width of the protrusion part is gradually narrowed as it approaches the second optical circuit 32. The height of the SiO$_2$ core gradually decreases from the first optical circuit 31 toward the second optical circuit 32. A composition ratio (an area ratio) between the protrusion part of the underclad and the SiO$_2$ core covering the protrusion part is gradually changed. In the optical connection part 33, when viewed in the cross-section perpendicular to the length direction of the optical waveguide, the structures of the SiO$_2$ core and the underclad are gradually changed between the two optical circuits as described above. It can be understood that the optical waveguide component of the present disclosure realizes the mismatch of MFD and the relaxation of the center position deviation of the MF, because the size and the composition ratio in the optical connection between the first optical circuit and the second optical circuit are continuously changed as described above.

The height of the protrusion part from the low-level surface of the underclad 38-2 is a value obtained by subtracting a half of the Si core thickness from a half of the SiO$_2$ core thickness so that the center height of the Si optical waveguide 4 and the core 35-2 of the SiO$_2$ waveguide match with each other. In Example 2, the height is 2.14 μm (4.5 μm/2-0.22 μm/2). At this time, the upper surface of the protrusion part (the high-level surface of the underclad 38-1) matches the bottom surface of the Si core 4 and the bottom surface of the protrusion part (the low-level surface of the underclad 38-2) matches the bottom surface of the SiO$_2$ core 35-2. By making the heights of the centers of the Si core and the SiO$_2$ core equal, the SiO$_2$ core is used as an input and output optical waveguide on one short side as shown in FIG. 9, and when two optical fibers are arranged on the chip end face, the optical waveguide and the optical fiber are connected without eccentricity, and optical connection loss can be reduced.

Figure 12A:
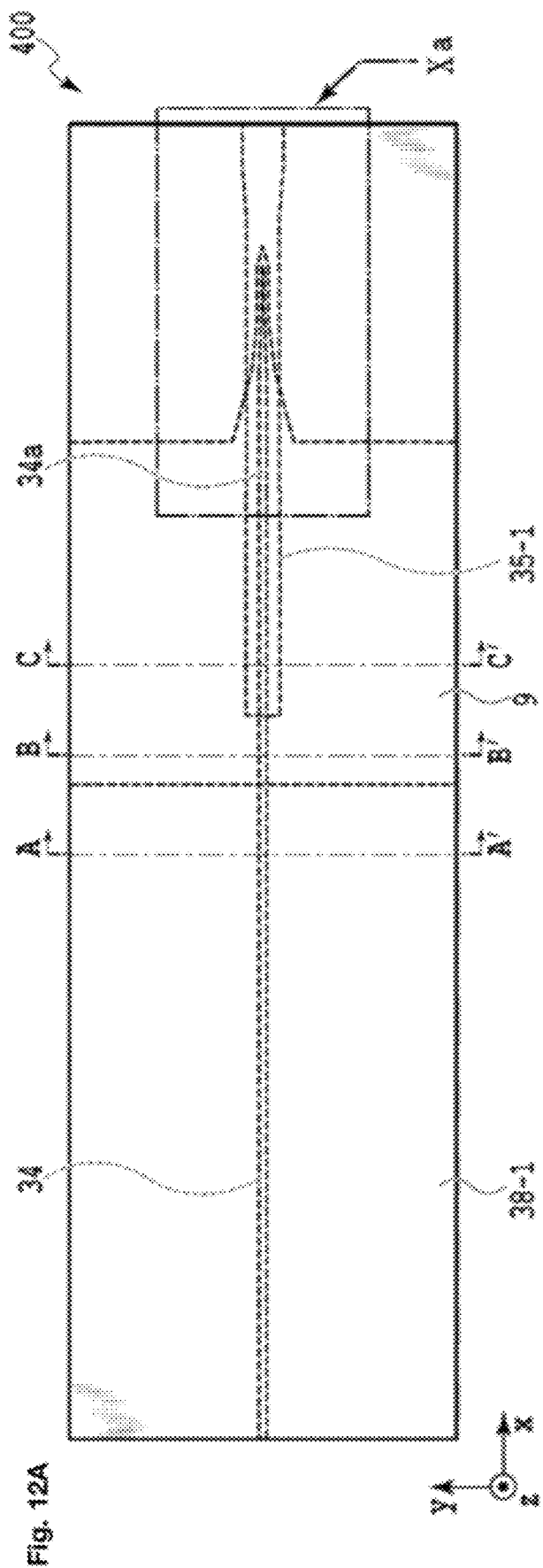
FIG. 12A is a top view of the substrate plane (x-y plane) of the optical circuit of example 2 and FIG. 12B is a side view of the cross-section (x-z plane) passing through the centers of the optical waveguides of the optical circuit.
Figure 12B:
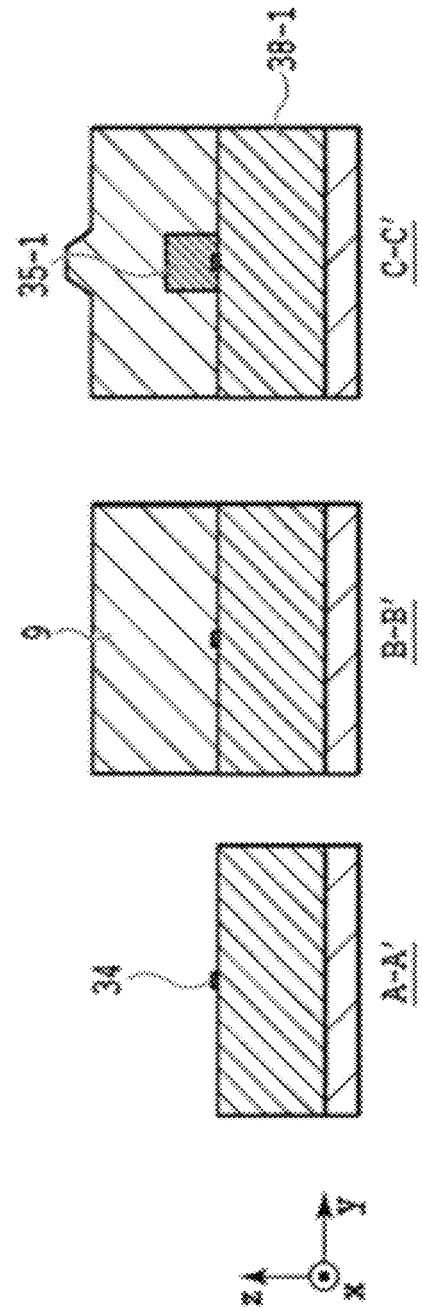

FIGS. 12A and 12B are diagrams showing a configuration example of another optical circuit including the optical waveguide component of Example 2. FIG. 12A is a top view of the substrate plane (x-y plane) of the optical circuit 40, and FIG. 12B is a side view of the cross-section (x-z plane) passing through the centers of the optical waveguides 34 and 34a of the optical circuit 40. The optical circuit 40 shown in FIGS. 12A and 12B includes the optical waveguide component 300 shown in FIGS. 10A and 10B of Example 2 in the region of the dashed line in the top view of FIG. 12A, and further shows the extension part of the structure of Example 2 on the Si core side. In the optical circuit 40 of FIGS. 12A and 12B, the structure of the cross-section C-C' of 12B is identical to that of the cross-section A-A' in FIG. 11 of Example 2. On the other hand, the SiO$_2$ core 35-1 covering the Si core is removed in the cross-section B-B' of FIG. 12B. Further, in the cross-section A-A', both of the overclad 9 and the SiO$_2$ core 35-1 on the SiPh circuit side are removed, and the Si core 34 is provided so as to be exposed. By providing a region in which the Si core is exposed in the SiPh circuit, processes such as dopant introduction into the Si core 34, semiconductor film formation, heater and metal wiring formation can be performed, and functionality of the optical circuit can be widened.

Again, returning to the optical waveguide component of Example 2, similarly to Example 1, the optical connection loss of the optical connection part 33 of the optical circuit 30 shown in FIG. 9 is evaluated by light of the wavelength of 1.55 μm. As a result of calculating the optical connection loss of the optical connection part 33, the optical connection loss of the optical connection part 33 of the optical circuit 30 of Example 2 having the structures shown in FIGS. 10A, 10B and 11 is 0.50 dB. The still smaller value than 0.70 dB of the optical connection loss of the optical connection part 23 of the optical circuit 20 of Example 1 having the structures shown in FIGS. 7A, 7B and 8 was obtained. As compared with 0.85 dB loss of the structure in which only the underclad steps are provided in the optical circuit of the prior art shown in FIGS. 4A and 4B, it can be seen that the optical connection loss is greatly improved.

In the optical waveguide component 300 of Example 2 shown in FIGS. 10A, 10B and 11, the cross-sectional structure gradually changes at the optical connection part due to the double structure in which the cross-sectional region of the Si core is included in the cross-sectional region of the SiO$_2$ core. In a cross-section perpendicular to the length direction of the optical waveguide, an area ratio of the SiO$_2$ core to the protrusion part of the underclad increases from the first optical circuit toward the second optical circuit, and the SiO$_2$ core gradually covers the Si core. It is considered that the mismatch of the MFD size is reduced by a smooth cross-sectional structure change in which the width of the protrusion part of the underclad is gradually narrowed and the height of the SiO$_2$ core is gradually lowered at the same time. Further, the deviation between the MF center of the propagation light of the Si core and the MF center of the propagation light of the SiO$_2$ core is suppressed by the tapered structure of the width of the protrusion part formed extending from the high-level surface of the underclad toward the low-level surface and the vertical tapered structure of the corresponding SiO$_2$ core. It was also confirmed that the optical waveguide component of the present disclosure can be optically connected with a low loss by a simple structure and a simple manufacturing method.

Figure 13A:
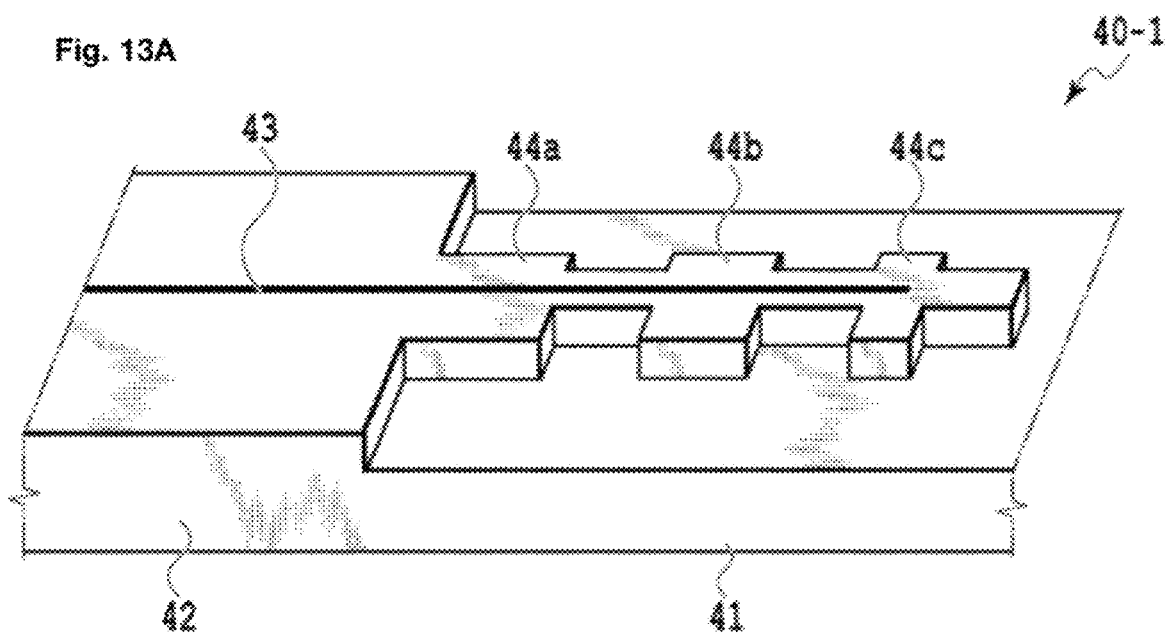
FIG. 13A is an optical waveguide component obtained by segmenting the protrusion part and FIG. 13B is an optical waveguide component having slope parts on both sides of the protrusion part.
Figure 13B:
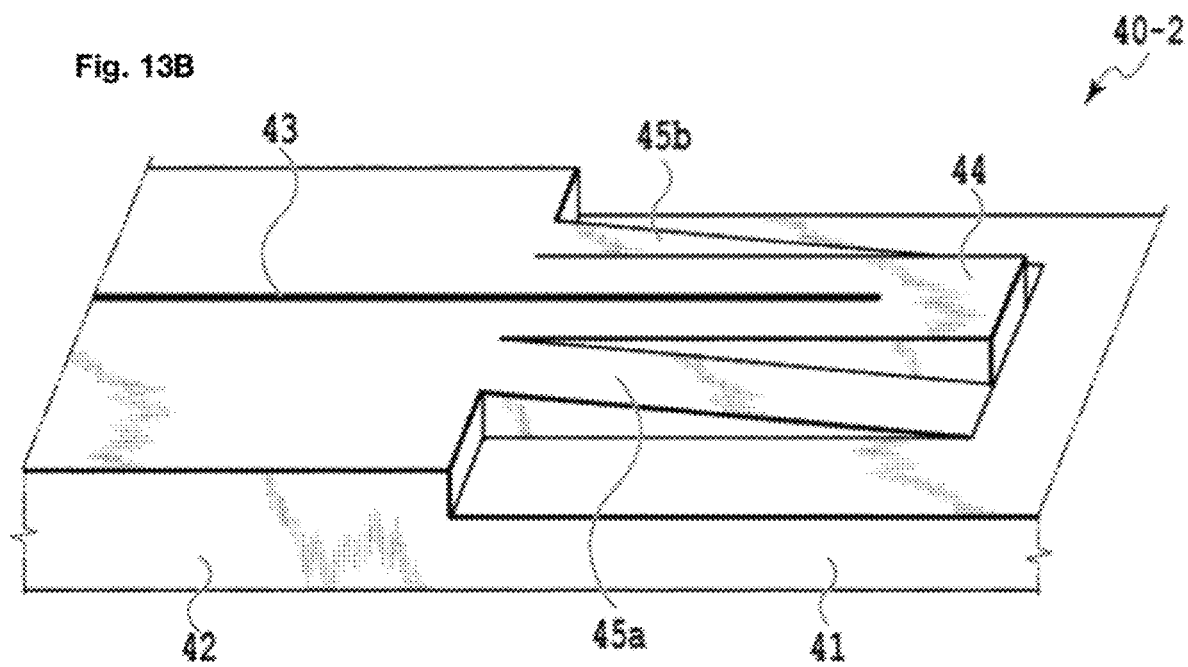

FIGS. 13A and 13B are diagrams showing a modification example of a configuration of a protrusion part in the optical component of the present disclosure. FIG. 13A shows an optical waveguide component 40-1 obtained by segmenting the protrusion part, and FIG. 13B shows an optical waveguide component 40-2 having slope parts on both sides of the protrusion part. All of them show the structure of only the protrusion part, and the SiO$_2$ core is formed along the protrusion part in the same manner as in each of the above Examples.

The optical waveguide component 40-1 shown in FIG. 13A has the protrusion part having a structure in which the segments of two different width are alternatively connected from the high-level surface to the low-level surface of the underclad layer 42. A narrow part is sandwiched between the three wide parts 44a, 44b and 44c, and the length in the optical waveguide direction of the three parts of the protrusion part is gradually shortened. The Si core 43 is formed from the high-level surface of the underclad layer 42 to the middle of the protrusion part. Even in such a configuration that the protrusion part is segmented, when viewed in a cross-section perpendicular to the length direction of the optical waveguide, the occupancy rate of the SiO$_2$ core (not shown) is increased with respect to the protrusion part of the underclad from the high-level surface side toward the low-level surface. On the contrary, the cross-sectional area of the protrusion part is gradually reduced from the high-level surface side toward the low-level surface. The effective cross-sectional area of the protrusion part is gradually reduced, so that the height of the SiO$_2$ region corresponding to the protrusion part is gradually lowered toward the low-level surface, and the vertical tapered structure is obtained.

The optical waveguide component 40-2 shown in FIG. 13B has a simple rectangular parallelepiped shaped protrusion part 44 extending from the high-level surface toward the low-level surface of the underclad layer 42. Further, slope parts 45a, 45b are provided on both sides along the protrusion part 44, which gradually lowers its height from the high-level surface and reaches the low-level surface. The Si core 43 is formed from the high-level surface of the underclad layer 42 to the middle of the protrusion part 44. Even in the configuration including such the slope parts, when viewed in a cross-section perpendicular to the length direction of the optical waveguide, the occupancy rate of the SiO$_2$ core increases with respect to the protrusion part of the underclad from the high-level surface side toward the low-level surface. The effective cross-sectional area of the protrusion part is gradually reduced, so that the height of the SiO$_2$ region is gradually reduced toward the low-level surface, and the vertical tapered structure is obtained. The slope part of FIG. 13B may be formed in a step shaped. As described above, the shape of the protrusion part can be variously changed.

As described in detail above, by providing the configuration of the optical connection part of the present disclosure, it is possible to provide the optical waveguide component and the method of manufacturing the optical waveguide component which realizes low-loss optical connection with a simple structure.

INDUSTRIAL APPLICABILITY

The present invention can be applied to the device using an optical communication.

The invention claimed is:

1. An optical waveguide component for optically connecting optical waveguides composed of different materials on a substrate, the optical waveguide component comprising:
   a first optical circuit having an optical waveguide serving as a first core composed of a first material;
   a second optical circuit having an optical waveguide serving as a second core composed of a second material with a refractive index lower than a refractive index of the first material; and
   an optical connection part between the first core and the second core, wherein
   the second core is configured to extend to the first optical circuit so that a region including the entire first core is included in a region including the entire second core in a cross-section perpendicular to the optical waveguide,
   the optical connection part has a vertical tapered structure in which a height of an extended portion of the second core is lowered from the first optical circuit toward the second optical circuit,
   the substrate includes an underclad layer having a step formed by a high-level surface in the first optical circuit and a low-level surface in the second optical circuit, and
   the optical connection part, at a position corresponding to the vertical tapered structure, has a protrusion part that is formed continuously from the high-level surface and gradually reduces a cross-sectional area toward the second optical circuit.

2. The optical waveguide component according to claim 1, wherein
   the protrusion part includes a tapered structure in which a width is narrowed toward the second optical circuit.

3. The optical waveguide component according to claim 1, wherein
   the first core is extended to a middle of the protrusion part on an upper surface of the protrusion part, and
   a spot size converter is configured corresponding to the vertical tapered structure.

4. The optical waveguide component according to claim 1, wherein
   a width of the protrusion part is wider than a width of the first core.

5. The optical waveguide component according to claim 1, wherein
   a center height of the first core and a center height of the second core are matched with each other.

6. The optical waveguide component according to claim 1, wherein
   a material of the underclad layer is SiO$_2$,
   the first material is any one of Si, SiN, and SiON,
   the second material is any one of SiO$_2$, SiO$_x$, and polymer.

7. A method of manufacturing an optical waveguide component for optically connecting optical waveguides composed of different materials, the method of manufacturing the optical waveguide component comprising:

forming a first core composed of a first material on a substrate having an underclad layer;

forming, by processing the underclad layer, a high-level surface corresponding to a first optical circuit, a low-level surface corresponding to a second optical circuit, and a protrusion part extending along the first core from the high-level surface toward the second optical circuit;

depositing a core layer of a second material having a lower refractive index than the first material on the processed underclad layer; and forming a second core from the first optical circuit to the second optical circuit by processing the deposited core layer and forming a vertical tapered structure in which the second core is configured to include a region including the entire first core in a region including the entire second core in a cross-section perpendicular to the length direction of the optical waveguide, and a height of the second core is lowered from the first optical circuit toward the second optical circuit.

* * * * *